United States Patent [19]

Serizawa et al.

[11] Patent Number: 5,283,531
[45] Date of Patent: Feb. 1, 1994

[54] DEMODULATION APPARATUS INCORPORATING ADAPTIVE EQUALIZER FOR DIGITAL COMMUNICATION

[75] Inventors: Mutsumu Serizawa; Minoru Namekata, both of Tokyo; Koji Ogura; Katsumi Sakakibara, both of Kanagawa, all of Japan

[73] Assignee: Kabushiki Kaisha Toshiba, Kawasaki, Japan

[21] Appl. No.: 64,922

[22] Filed: May 24, 1993

Related U.S. Application Data

[62] Division of Ser. No. 905,413, Jun. 29, 1992, Pat. No. 5,214,391, which is a division of Ser. No. 625,292, Dec. 6, 1990, Pat. No. 5,159,282.

[30] Foreign Application Priority Data

Dec. 6, 1989 [JP] Japan .................. 1-317065
Jul. 16, 1990 [JP] Japan .................. 2-185434

[51] Int. Cl.$^5$ .......................... H03D 3/00; H04B 1/12
[52] U.S. Cl. ........................... 329/316; 329/318; 329/327; 375/14; 375/102; 455/303; 455/312
[58] Field of Search ............ 329/315, 316, 318, 327; 375/11, 12, 14, 15, 16, 51, 57, 58, 82, 102; 455/65, 214, 303, 307, 312, 337, 296

[56] References Cited

U.S. PATENT DOCUMENTS

| | | | |
|---|---|---|---|
| 3,537,008 | 10/1970 | Lakatos | 455/65 |
| 4,151,475 | 4/1979 | von der Neyen | 375/102 |
| 4,246,541 | 1/1981 | Ishigaki | 329/316 |
| 4,726,073 | 2/1988 | Sessink | 455/65 X |
| 4,859,957 | 8/1989 | Braun | 329/327 |

FOREIGN PATENT DOCUMENTS 63-51737 3/1988 Japan .
64-8750 1/1989 Japan .

OTHER PUBLICATIONS

Shahid U. H. Qureshi, "Adaptive Equalization," Proceedings of the IEEE, vol. 73, No. 9, Sep. 1985, pp. 1349–1387.

*Primary Examiner*—Siegfried H. Grimm
*Attorney, Agent, or Firm*—Foley & Lardner

[57] ABSTRACT

A demodulation apparatus incorporating an adaptive equalizer, capable of realizing a highly reliable communication, lower power consumption, and a compact size. In the demodulation apparatus, an output of one of two demodulators, at least one of which including an equalizer, is selected according to a presence or absence of multipath which is determined from a non-coincidence of bit codes, eye apertures, bit error ratea, or a matched filter output, while the operation of the other demodulator is stopped for reduction of power consumption, by stopping a supply of power or clock signals to the other demodulator. In a case using a frequency offset detection unit and a frequency offset memory, one of these is selected according to a convergence or divergence of an error signal from an equalizer, while the operation of the other one is stopped for reduction of power consumption.

6 Claims, 35 Drawing Sheets

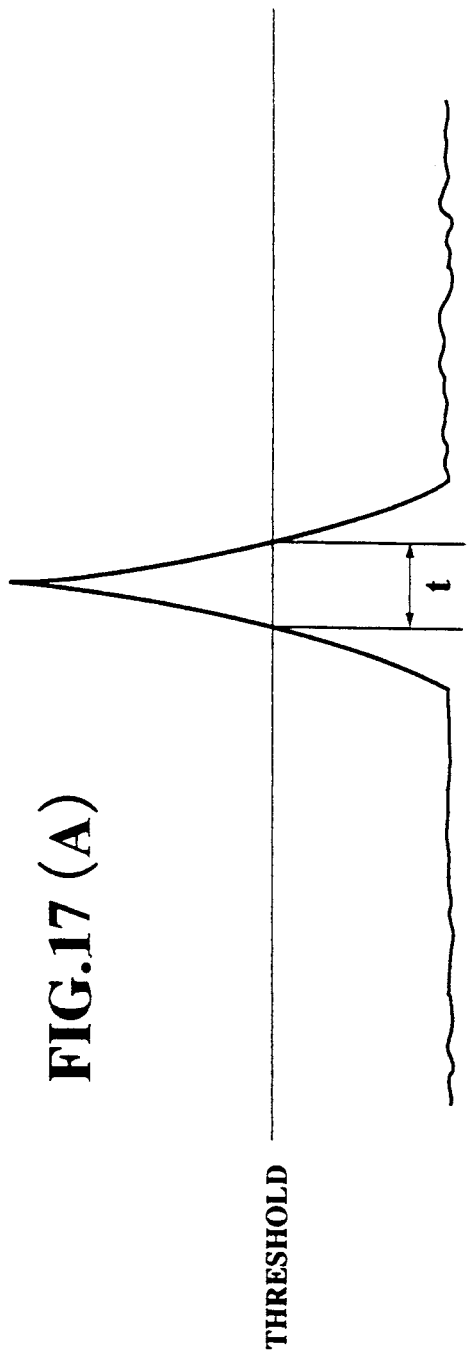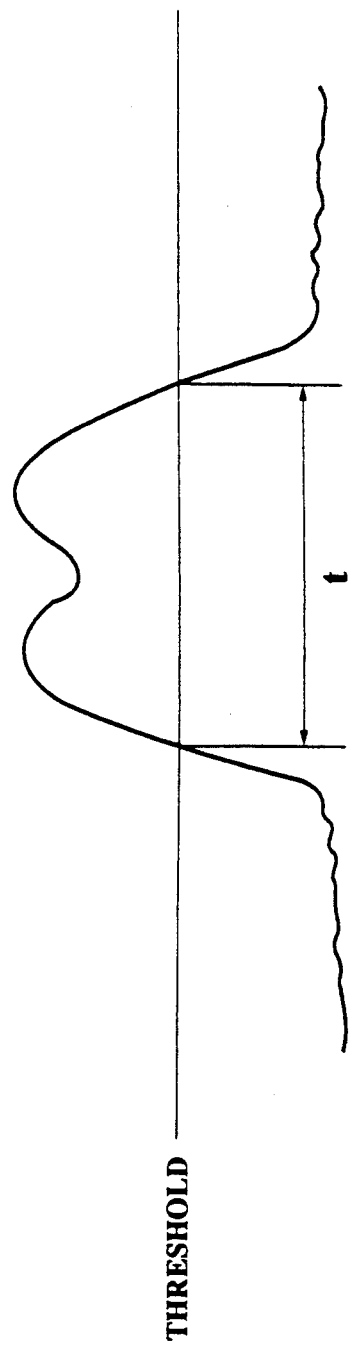
FIG.17 (A)
FIG.17 (B)

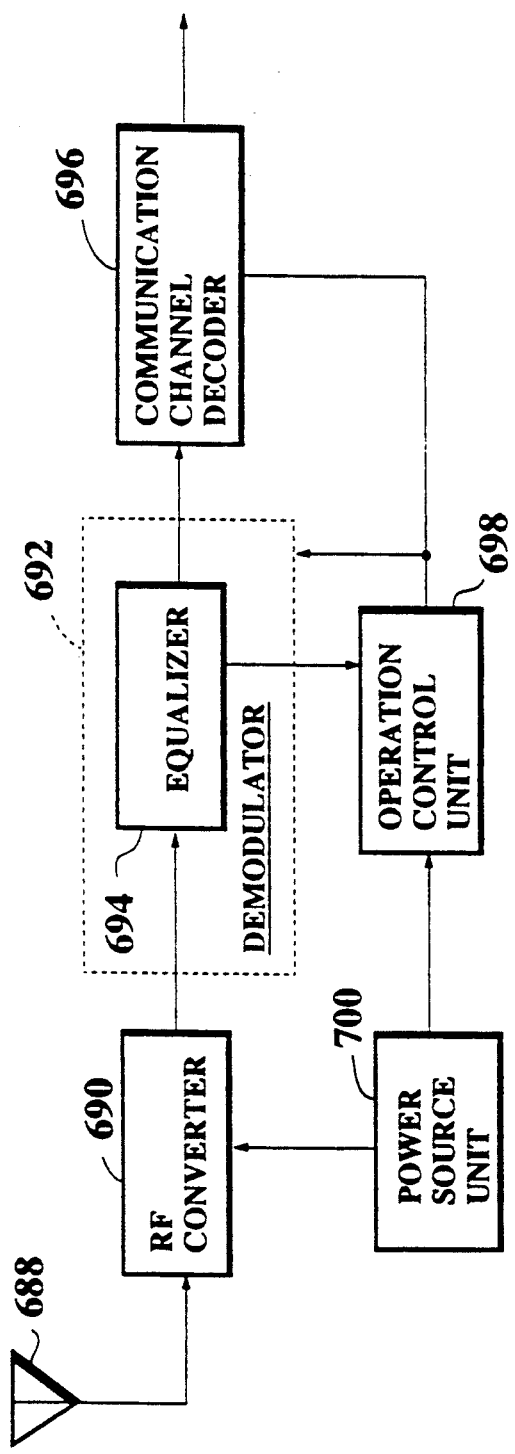
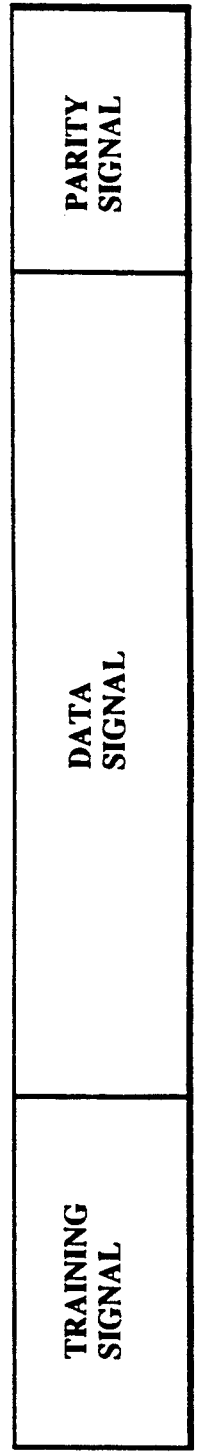

DEMODULATION APPARATUS INCORPORATING ADAPTIVE EQUALIZER FOR DIGITAL COMMUNICATION

This application is a divisional of application Ser. No. 07/905,413, filed Jun. 29, 1992, now U.S. Pat. No. 5,214,391 which is a divisional of prior application Ser. No. 07/625,292 filed Dec. 6, 1990, now U.S. Pat. No. 5,159,282.

BACKGROUND OF THE INVENTION

1. Field of the Invention

The present invention relates to a demodulation apparatus for demodulating received input signals, and more particularly, to such a demodulation apparatus which incorporates an adaptive equalizer so that it is suitable for application in a digital mobile communication.

2. Description of the Background Art

In a digital communication involving multipath as in a case of a digital mobile communication, a received input signal is affected by a communication path distortion due to the multipath. In general, in demodulating such a received input signal, a bit error rate can be reduced by detecting after an equalization is performed, using an adaptive equalizer for example.

However, when the equalizer such as an adaptive equalizer is applied to the received input signal transmitted through a path involving only shortly delayed multipath reflections, the bit error rate can actually be increased compared with a case of not using the adaptive equalizer at all.

In fact, under a circumstance in which the communication environment widely changes depending on a location of a receiver, as in a case of mobile communication such as an automobile telephone or a portable telephone, there are locations for which the multipath hardly exist, for instance in a vicinity of a local transmission station, where the use of the adaptive equalizer becomes completely superfluous.

For this reason, there has been a proposition for a selective use of a demodulator incorporating the adaptive filter, as disclosed in Japanese Patent Application Laid Open No. 64-8750.

A demodulation apparatus disclosed in this reference is shown in FIG. 1. In this demodulation apparatus, a distributor 1 distributes a received input signal into two passages, one of which is connected to a first demodulator 4 incorporating an adaptive equalizer, while the other one of which is connected to a second demodulator 6 without an adaptive equalizer. Either one of outputs of the first and second demodulators 4 and 6 is then selected by a signal selection device 7 according to a judgement made by a judging device 9 which judges the output with a smaller bit error rate from the outputs of the first and second demodulators 4 and 6 by comparing a bit error rate value measured by a measuring device 8 with a prescribed threshold value, where the measurement is based on an S/N ratio of the received input signal.

In such a conventional demodulation apparatus, the bit error rate is obtained by comparing a sign of the training signal inserted into the received input signals and the sign of the received input signal.

However, the number of training signals is much smaller than that of the received input signals so that a considerably long period of time is required in order to obtain a sufficiently reliable threshold value, and there is a possibility that a path of large bit error rate may be selected during this period of time.

For instance, for a TDMA using 256 bits per one burst and 15 bit training signal, in order to achieve the bit error rate threshold value of $10^{-6}$ as in the aforementioned reference, at least $10^6$ bits are necessary, which means at least $8 \times 10^4$ bursts are necessary. Even when the threshold value is lowered to $10^{-2}$, several tens of bits are still necessary. Therefore, the time required for determining the threshold value cannot be dismissed as ignorable.

Furthermore, in such a conventional demodulation apparatus, both the first and second demodulators 4 and 6 have to be maintained in activated states throughout the operation of the demodulation apparatus. In other words, the power have to be supplied constantly to both of the first and second demodulators 4 and 6 in such a conventional demodulation apparatus.

This requirement can be a severe limitation for some applications of the demodulation apparatus such as those of automobile telephone and portable telephone in which a battery capacity is rather limited. This problem is practically very important because the power consumption by an equalizer is much larger than other components of the demodulation apparatus.

For instance, in a case of an adaptive equalizer using an RLS algorithm, setting a number of taps to be 5, and taking the coefficients between 3 to 5, because (3 to 5)$\times 5^2 = 75$ to 125, at most 123 complex multiplications have to be performed. Since the differential demodulator requires only one complex multiplication, this implies that the adaptive equalizer can consume up to 125 times greater power than the differential demodulator.

Moreover, in this type of a conventional demodulation apparatus, the use of the first demodulator with an adaptive equalizer and the second demodulator without an adaptive equalizer causes a difference in demodulated signal output timing depending on which one of the first and second demodulator is used, such that in the subsequent operations in the demodulation apparatus such as those of the error correction codec and voice codec have to take this difference into account.

Furthermore, a conventional demodulation apparatus incorporating an adaptive equalizer has not been able to produce a good bit error rate performance consistently. The bit error rate performance depends on the equalizer structure and dynamic change of multipath conditions. For example, a conventional adaptive equalizer is not capable of compensating the multipath very well when the multipath condition changes from a non-minimum phase condition to a minimum phase condition. Also, a conventional adaptive equalizer is not capable of adapting to the channel movement when the fading pitch is extremely high. If the equalizer fails to track the dynamic movement of the channel characteristics even once, it cannot continue to compensate the multipath any more, and a correct demodulation cannot be obtained thereafter. The equalizer remains in such a catastrophic state until the next training sequence is received, by means of which the equalizer re-establish the tracking of the dynamic movement of the channel characteristics.

On the other hand, in a more general type of a conventional demodulation apparatus, a frequency offset is generated because of the discrepancy between the transmission frequency of the received input signals and the oscillation frequency of a local oscillator, and this frequency offset have to be removed.

An example of such a conventional demodulation apparatus is shown in FIG. 2.

In this demodulation apparatus, the RF (IF) signals received at an input terminal 11 is multiplied by an output of a local oscillator 12 at a multiplier 13, so as to be converted into baseband signals.

The high frequency components of the obtained baseband signals are then eliminated by a low pass filter 4, while the frequency offset is detected from the output of the multiplier 13 by a frequency offset detection device 16, such that the frequency offset can be removed at a frequency offset removal device 15.

The baseband signals without the frequency offset thus obtained are then equalized by an equalizer 17, and then sent to a demodulation unit (not shown) for performing further processing such as an error correction.

Such a demodulation apparatus is also equipped with a power source unit 18 for supplying activation power to each element of the apparatus.

Now, in this type of a conventional demodulation apparatus, the frequency offset detection device 16 and the demodulation unit have to be maintained in activated states throughout the operation of the apparatus.

As in the previous example, this requirement can be a severe limitation for some applications of the demodulation apparatus such as those of automobile telephone and portable telephone in which a battery capacity is rather limited.

Also, in this case, in order to maintain the frequency offset detection device 16 constantly activated, a huge amount of calculations becomes necessary, which implies that a huge number of gates are necessary in terms of hardware requirement, so that the compact size or large scale integration for the apparatus becomes difficult to realize.

In particular, when the transversal filter type device is used as the frequency offset detection unit 16, the considerations for the power consumption and the amount of calculations can be serious problems practically.

SUMMARY OF THE INVENTION

It is therefore an object of the present invention to provide a demodulation apparatus incorporating adaptive equalizer, capable of preventing a communication through a path of large bit error rate over an unignorable period of time.

Another object of the present invention is to provide a demodulation apparatus incorporating adaptive equalizer, capable of reducing a total power consumption during its operation.

Another object of the present invention is to provide a demodulation apparatus incorporating adaptive equalizer, capable of a realizing a compact size or large scale integration for the apparatus.

According to one aspect of the present invention there is provided a demodulation apparatus, comprising: a distributor for distributing an input signal to a first and a second passages; a first demodulator including an equalizer capable of compensating a transmission path distortion, connected with the first passage, for demodulating the input signal; a second demodulator, connected with the second passage, for demodulating the input signal; means for measuring a rate of non-coincidence between bit codes of outputs of the first and second demodulators; and means for selectively outputting one of the outputs of the first and second demodulators according to the measured rate of non-coincidence.

According to another aspect of the present invention there is provided a demodulation apparatus, comprising: a distributor for distributing an input signal to a first and a second passages; a first demodulator including an equalizer capable of compensating a transmission path distortion, connected with the first passage, for demodulating the input signal; a second demodulator, connected with the second passage, for demodulating the input signal; means for measuring eye apertures of outputs of the first and second demodulators; and means for selectively outputting one of the outputs of the first and second demodulators according to the measured eye apertures.

According to another aspect of the present invention there is provided a demodulation apparatus, comprising: a distributor for distributing an input signal to a first and a second passages; a first demodulator including an equalizer capable of compensating a transmission path distortion, connected with the first passage, for demodulating the input signal; a second demodulator, connected with the second passage, for demodulating the input signal; means for measuring an eye aperture of an output of the second demodulator; and means for selectively outputting one of the outputs of the first and second demodulators according to the measured eye aperture.

According to another aspect of the present invention there is provided a demodulation apparatus, comprising: a distributor for distributing an input signal to a first and a second passages; a first demodulator including an equalizer capable of compensating a transmission path distortion, connected with the first passage, for demodulating the input signal; a second demodulator, connected with the second passage, for demodulating the input signal; means for measuring a bit error rate of an output of the second demodulator; and means for selectively outputting one of the outputs of the first and second demodulators according to the measured bit error rate.

According to another aspect of the present invention there is provided a demodulation apparatus, comprising: a distributor for distributing an input signal to a first and a second passages; a first demodulator including an equalizer capable of compensating a transmission path distortion, connected with the first passage, for demodulating the input signal; a second demodulator, connected with the second passage, for demodulating the input signal; means for detecting a presence of multipath from the input signal; and means for selectively outputting one of the outputs of the first and second demodulators according to the detected presence of the multipath.

According to another aspect of the present invention there is provided a demodulation apparatus, comprising: a distributor for distributing an input signal to a first and a second passages; a first demodulator including an equalizer capable of compensating a transmission path distortion, connected with the first passage, for demodulating the input signal; a second demodulator, connected with the second passage, for demodulating the input signal; means for measuring a bit error rate of an output of the second demodulator; means for delaying an input of the first demodulator by a time taken by the second demodulator to demodulate the input signal and by the measuring means to measure the bit error rate; means for delaying an output of the second demodulator by a time taken by the first demodulator to demodulate the input signal; and means for selectively outputting one of the outputs of the first and second demodulators according to the measured bit error rate.

According to another aspect of the present invention there is provided a demodulation apparatus, comprising: oscillator means for generating a oscillator signal of a prescribed frequency; means for obtaining a baseband signal from an input signal and the oscillator signal; means for detecting a frequency offset from the baseband signal; means for memorizing the detected frequency offset; means for removing the detected frequency offset from the baseband signal; equalizer means for demodulating and equalizing an output of the removing means; means for controlling operation of the detecting means and memorizing means according to an error signal from the equalizer means; and means for selectively connecting one of the detecting means and the memorizing means with the removing means according to the error signal from the equalizer means.

According to another aspect of the present invention there is provided a demodulation apparatus, comprising: oscillator means for generating a oscillator signal of a variable frequency; means for obtaining a baseband signal from an input signal and the oscillator signal; means for detecting a frequency offset from the baseband signal; means for memorizing the detected frequency offset; equalizer means for demodulating and equalizing an output of the removing means; means for controlling operation of the detecting means and memorizing means according to an error signal from the equalizer means; and means for selectively connecting one of the detecting means and the memorizing means with the oscillator means according to the error signal from the equalizer means, wherein a frequency of the oscillator signal is set to cancel the detected frequency offset.

According to another aspect of the present invention there is provided a demodulation apparatus, comprising: oscillator means for generating a oscillator signal of a prescribed frequency; means for obtaining a baseband signal from an input signal and the oscillator signal; means for detecting a frequency offset from the baseband signal; means for memorizing the detected frequency offset; means for removing the detected frequency offset from the baseband signal; equalizer means for demodulating and equalizing an output of the removing means; means for controlling clock signal supply to the detecting means according to an error signal from the equalizer means; and means for selectively connecting one of the detecting means and the memorizing means with the removing means according to the error signal from the equalizer means.

According to another aspect of the present invention there is provided a demodulation apparatus, comprising: means for converting an input signal into an intermediate frequency signal; demodulator means including an equalizer means for obtaining a basic frequency signal from the intermediate frequency signal; means for detecting and correcting bit code errors in the basic frequency signal; and means for controlling operation of the demodulator means and the detecting means according to an error signal from the equalizer means.

Other features and advantages of the present invention will become apparent from the following description taken in conjunction with the accompanying drawings.

BRIEF DESCRIPTION OF THE DRAWINGS

FIGS. 17(A) and 17(B) are illustrations of signal diagram for an output of a matched filter used in the demodulation apparatus of FIG. 16, for cases of absence and presence of multipath, respectively.

FIG. 37 is a schematic block diagram of a fifteenth embodiment of a demodulation apparatus according to the present invention.

FIG. 38 is an illustration of an input data used in the demodulation apparatus of FIG. 37.

DETAILED DESCRIPTION OF THE PREFERRED EMBODIMENTS

Figure 1:
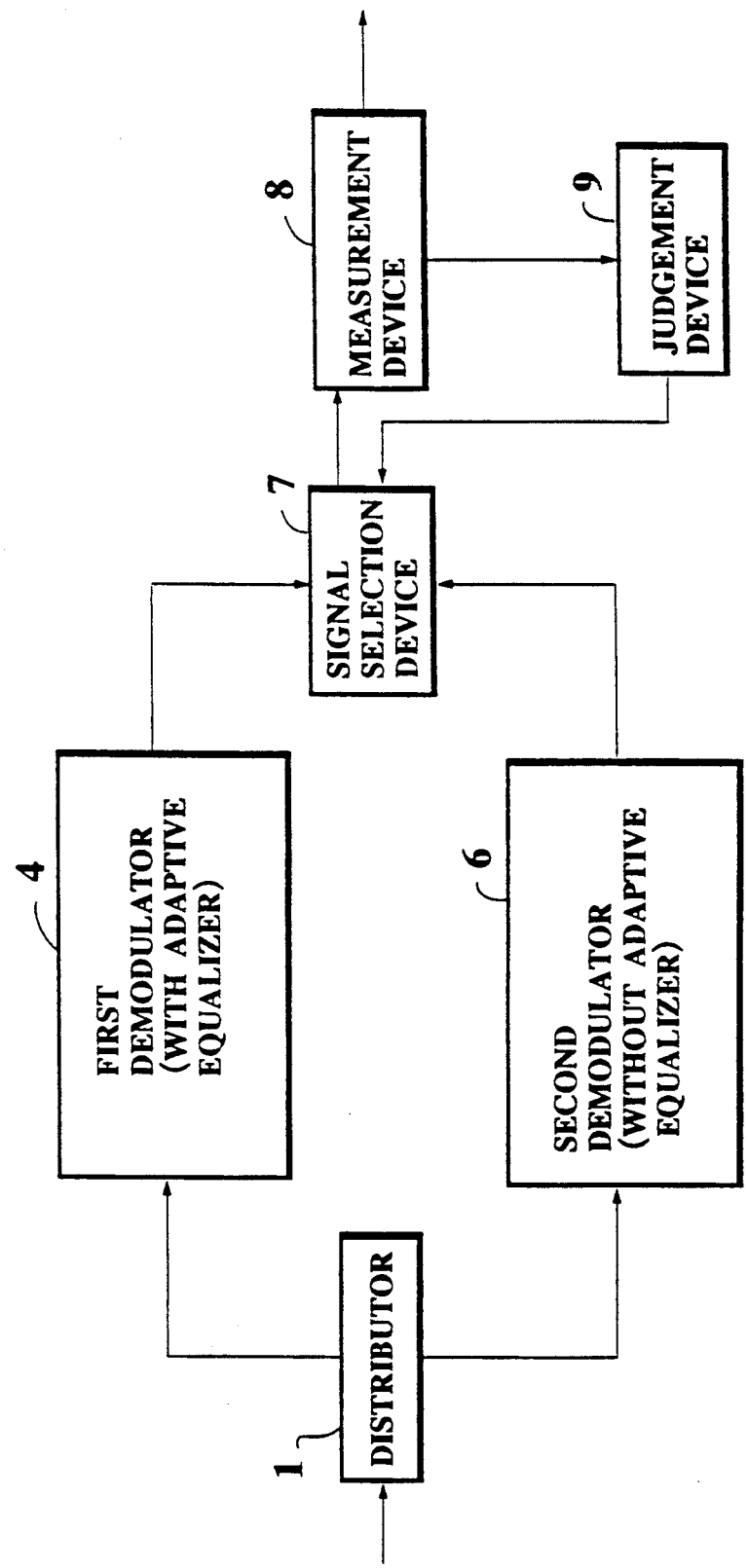
FIG. 1 is a schematic block diagram of one example of a conventional demodulation apparatus.
Figure 2:
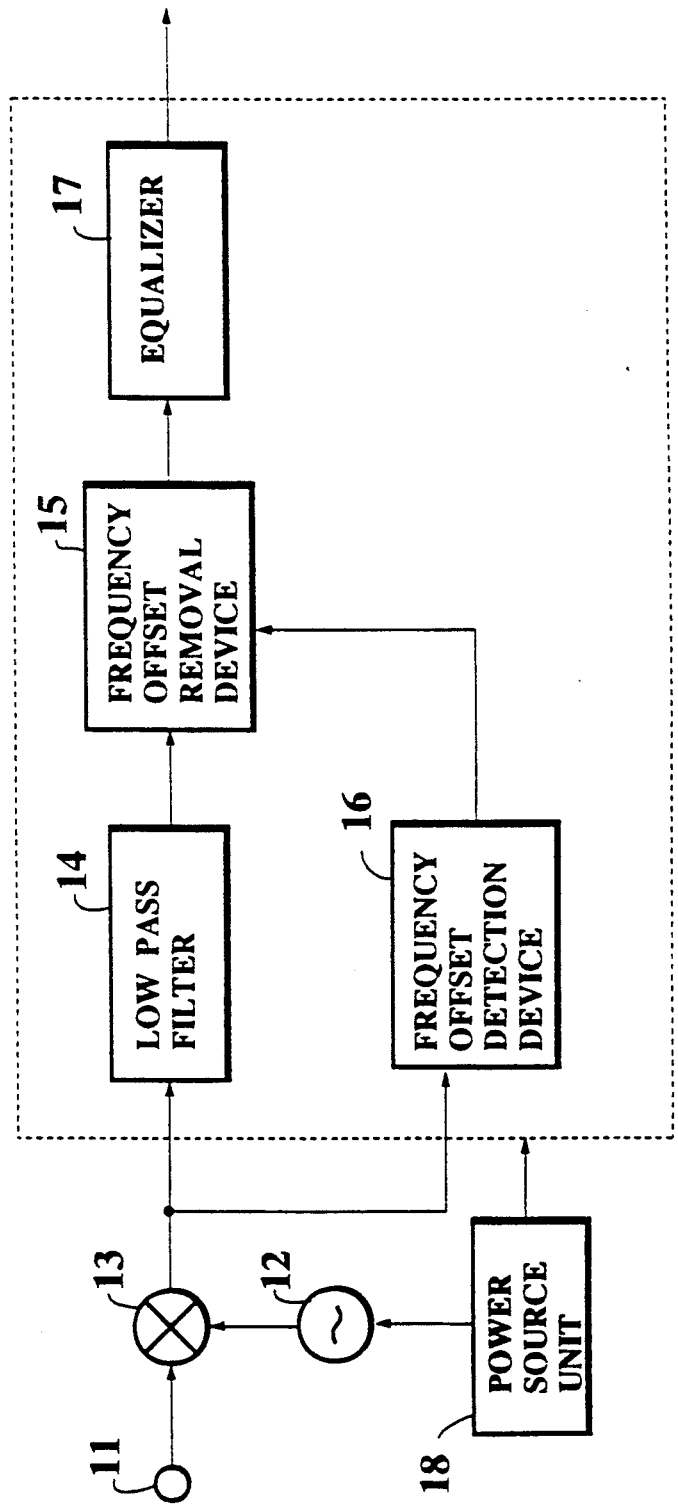
FIG. 2 is a schematic lock diagram of another example of a conventional demodulation apparatus.
Figure 3:
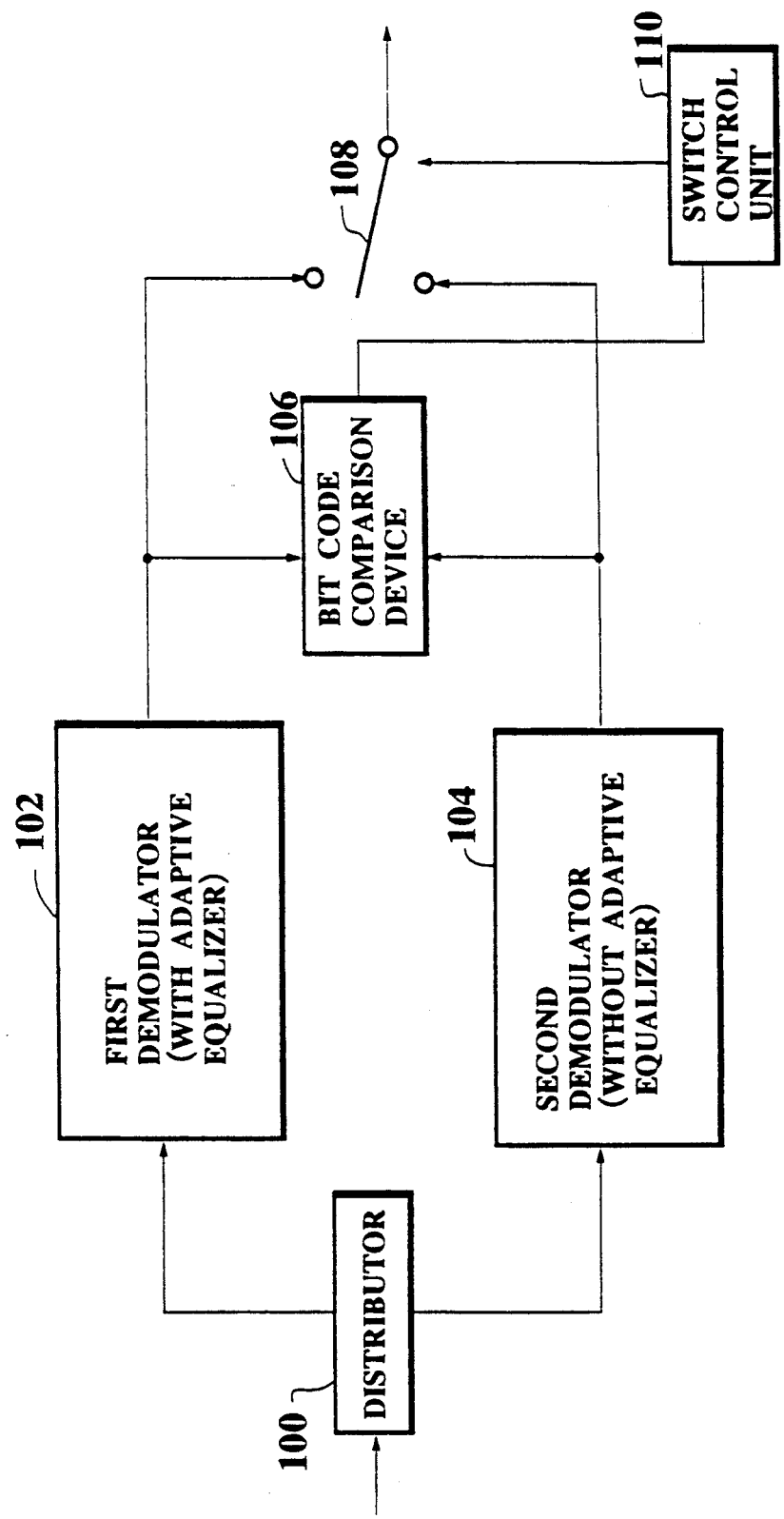
FIG. 3 is a schematic block diagram of a first embodiment of a demodulation apparatus according to the present invention.

Referring now to FIG. 3, a first embodiment of a demodulation apparatus according to the present invention will be described in detail.

In this embodiment, the demodulation apparatus comprises: a distributor 100 for distributing a received input signal into two passages; a first demodulator 102 incorporating an adaptive equalizer which is connected with one of the two passages coming from the distributor 100; a second demodulator 104 without an adaptive equalizer which is connected with the other one of the two passages coming from the distributor 100; a bit code comparison device 106 for comparing bit codes of the output signals from the first and second demodulators 102 and 104, a switch 108 for connecting an output of one of the first and second demodulators 102 and 104 while disconnecting the other one; and a switch control unit 110 for controlling the switch 108 in accordance with the result of comparison obtained by the bit code comparison device 106.

In this demodulation apparatus, a received input signal is distributed by the distributor 100 to the first and second demodulators 102 and 104. The first demodulator 102 incorporates the adaptive equalizer capable of compensating the communication path distortion due to the presence of multipath, and obtains a digital signal by demodulating the received input signal after the communication path distortion is compensated. On the other hand, the second demodulator 104 does not incorporate an adaptive equalizer, and obtains a digital signal by demodulating the received input signal directly. The bit code comparison device 106 compares the bit codes of the output digital signals from the first and second demodulators 102 and 104, in order to measure a rate of non-coincidence D of the bit codes, for a prescribed period of time such as a period for N bursts in a case of TDMA for instance. The bit code comparison device 106 also compares the measured rate of non-coincidence D with a prescribed threshold rate of non-coincidence Dc, and outputs a selection signal for indicating to the switch control unit 110 a selection of the first demodulator 102 in a case D>Dc, or of the second demodulator 104 otherwise. The switch control unit 110 then controls the switch 108 according to the indication of the selection signal from the bit code comparison device 106, so as to connect the indicated one of the first and second demodulators 102 and 104 while disconnecting the other one.

Figure 4:
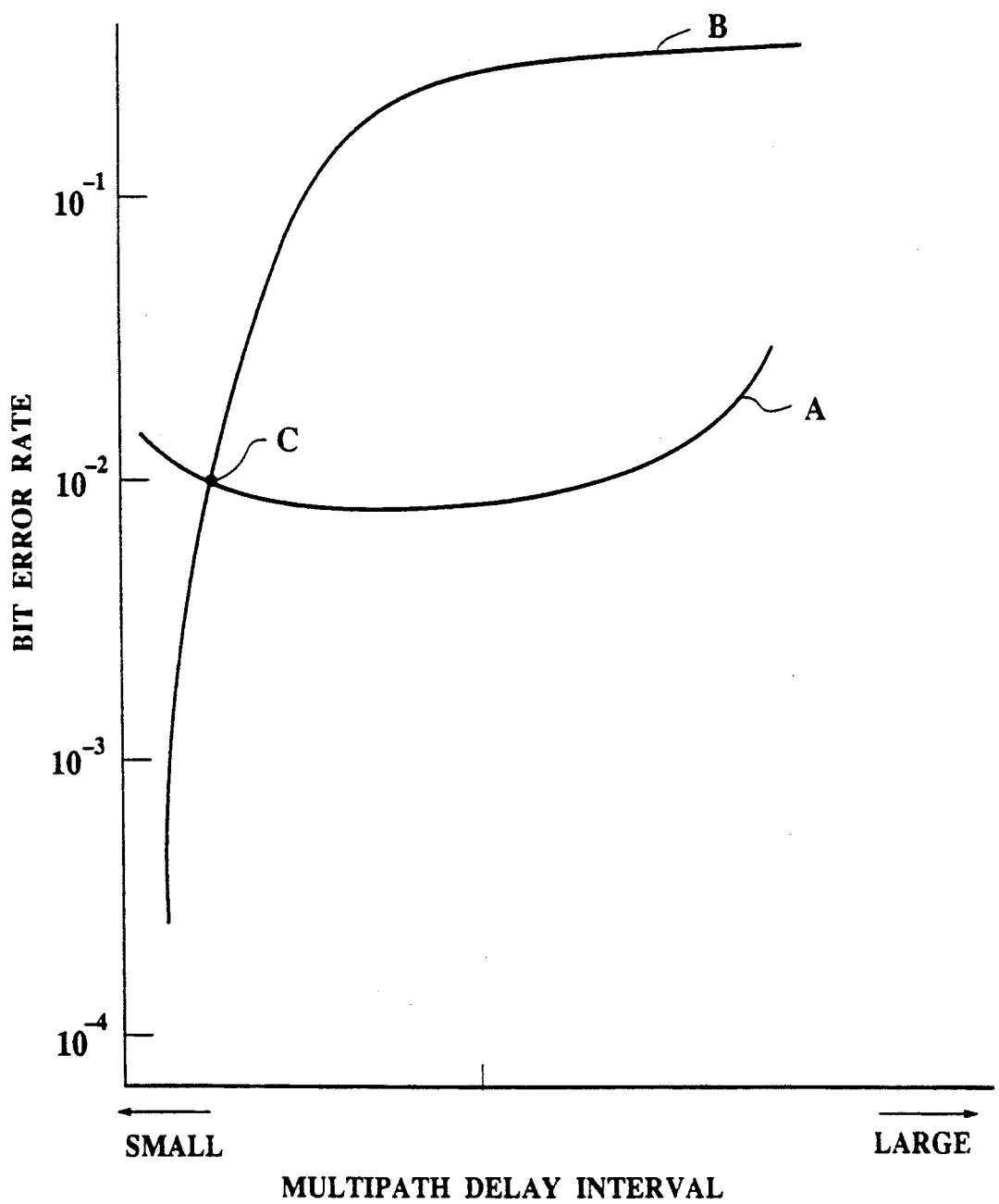
FIG. 4 is a graph of a bit error rate as a function of a multipath delay interval, for two demodulators incorporated in the demodulation apparatus of FIG. 3.

This selection on a basis of the rate of non-coincidence of the bit codes is effective in selecting one of the demodulators 102 and 104 which has a lower bit error rate. This is because, as shown in a graph of a bit error rate as a function of a multipath delay interval in FIG. 4 for a condition of $E_b/N_0 = 20$ dB, the bit error rate resulting from the first demodulator 102 incorporating the adaptive equalizer, which is indicated by a curve A, is relatively low for the large multipath delay interval compared with the bit error rate resulting from the second demodulator 104 without an adaptive equalizer, which is indicated by a curve B, while for the small multipath delay interval the bit error rate resulting from the first demodulator 102 is relatively high compared with the bit error rate resulting from the second demodulator 104. Now, for the multipath delay interval belonging to the left of an intersection C of the curves A and B, the rate of non-coincidence is about $10^{-2}$, while for the multipath delay interval corresponding to the intersection C, the rate of non-coincidence is less than $2 \times 10^{-2}$, and for the multipath delay interval belonging to the right of the intersection C, the rate of non-coincidence becomes much greater than $2 \times 10^{-2}$. Thus, by setting the threshold rate of non-coincidence Dc to $10^{-2}$, one of the demodulators 102 and 104 which has a lower bit error rate can be selected.

In this selection process, the entire demodulated signal corresponding to the entire received input signal which includes a training signal part and a data signal part is used in measuring the rate of non-coincidence, so that a time required for selecting one of the demodulators 102 and 104 which has a lower bit error rate is very short, compared with a conventional demodulation apparatus which utilizes only the training signal part of the received input signal in determining the bit error rate.

Figure 5:
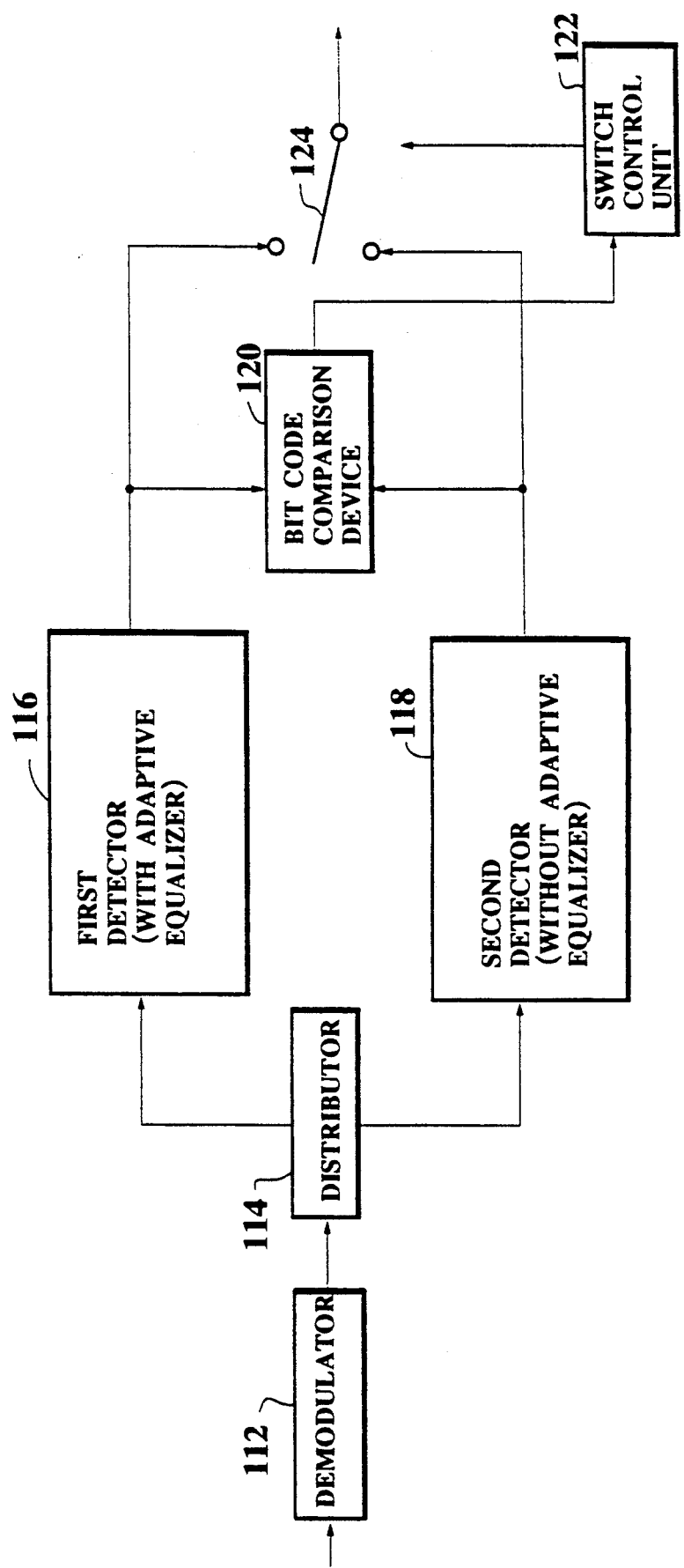
FIG. 5 is a schematic block diagram of a second embodiment of a demodulation apparatus according to the present invention.

Referring now to FIG. 5, a second embodiment of a demodulation apparatus according to the present invention will be described in detail.

In this embodiment, the demodulation apparatus comprises: a demodulator 112 for orthogonally demodulating the received input signal in order to obtain baseband signal; a distributor 114 for distributing a received input signal into two passages; a first detector 116 incorporating an adaptive equalizer which is connected with one of the two passages coming from the distributor 114; a second detector 118 without an adaptive equalizer which is connected with the other one of the two passages coming from the distributor 114; a bit code comparison device 120 for comparing bit codes of the output signals from the first and second detectors 116 and 118, a switch 124 for connecting an output of one of the first and second detectors 116 and 118 while disconnecting the other one; and a switch control unit 122 for controlling the switch 124 in accordance with the result of comparison obtained by the bit code comparison device 120.

In this demodulation apparatus, a received input signal is converted into the baseband signal first at the demodulator 112, and then distributed by the distributor 114 to the first and second detectors 116 and 118. The first detector 116 incorporates the adaptive equalizer capable of compensating the communication path distortion due to the presence of multipath, so as to obtain a digital signal corresponding to the received input signal with the multipath communication path distortion compensated. On the other hand, the second detector 118 does not incorporate an adaptive equalizer, and obtains a digital signal corresponding to the received input signal without the compensation of the multipath communication path distortion. The bit code comparison device 120 compares the bit codes of the output digital signals from the first and second detectors 116 and 118 in order to measure a rate of non-coincidence D of the bit codes, for a prescribed period of time, and compares the measured rate of non-coincidence D with a prescribed threshold rate of non-coincidence Dc, and then outputs a selection signal for indicating to the switch control unit 122 a selection of the first detector 116 in a case D>Dc, or of the second detector 118 otherwise. The switch control unit 122 then controls the switch 124 according to the indication of the selection signal from the bit code comparison device 120, so as to connect the indicated one of the first and second detectors 116 and 118 while disconnecting the other one.

Thus, in this demodulation apparatus of the second embodiment, the common functions of the first and second demodulators in the first embodiment described above which are related to functions other than the wave detection are commonly attributed to the demodulator 112, while the function of the wave detection is provided by the first and second detectors 116 and 118. As a consequence, this configuration is capable of realizing a simplified configuration, a compact size, and a lower operation power for the demodulation apparatus as a whole, which makes this embodiment particularly suitable for applications to the automobile telephone or the portable telephone for which the allowable size and power consumption of the apparatus are severely limited.

Figure 6:
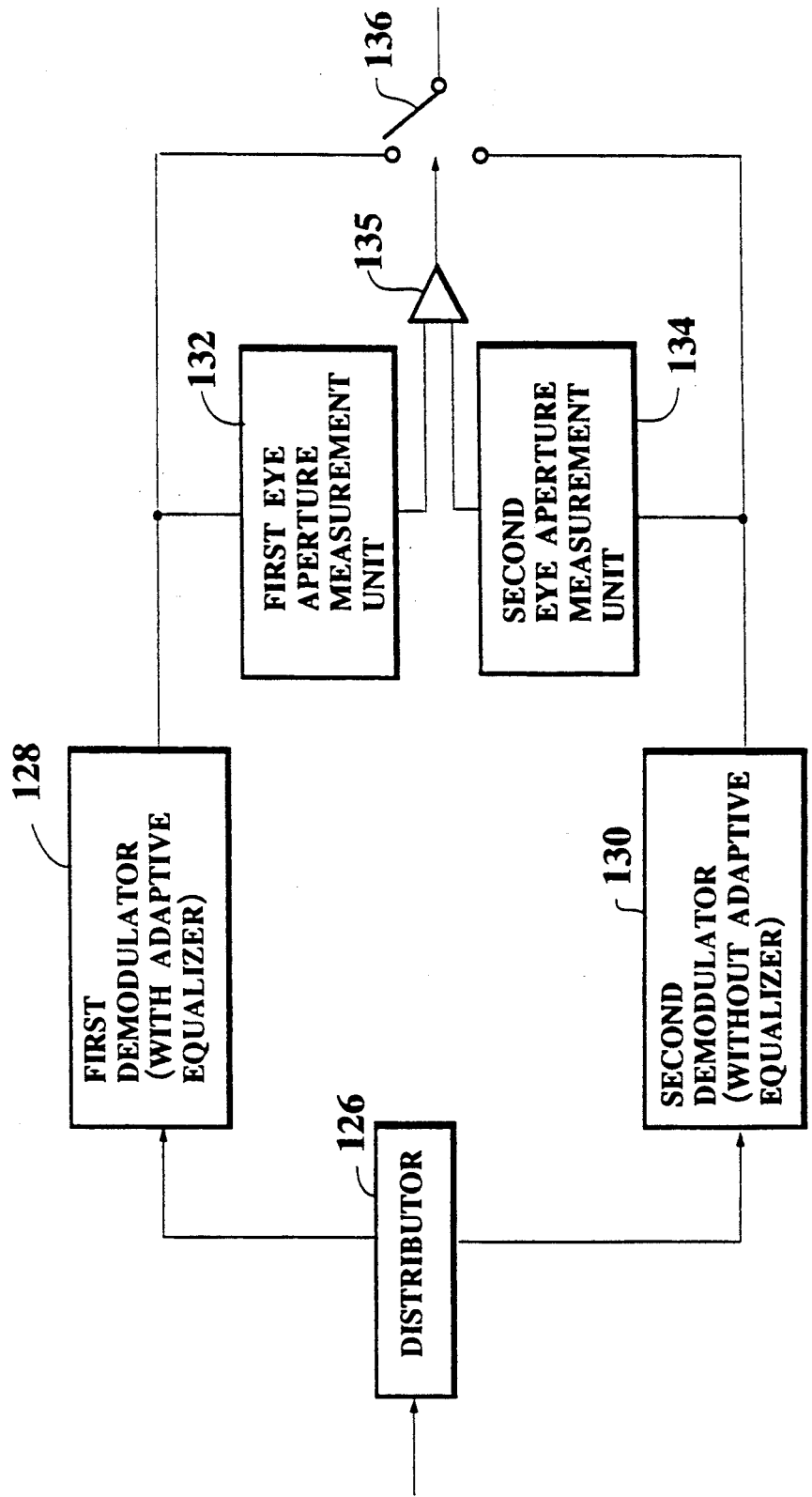
FIG. 6 is a schematic block diagram of a third embodiment of a demodulation apparatus according to the present invention.

Referring now to FIG. 6, a third embodiment of a demodulation apparatus according to the present invention will be described in detail.

In this embodiment, the demodulation apparatus comprises: a distributor 126 for distributing a received input signal into two passages; a first demodulator 128 incorporating an adaptive equalizer which is connected with one of the two passages coming from the distributor 126; a second demodulator 130 without an adaptive equalizer which is connected with the other one of the two passages coming from the distributor 126; a first eye aperture measurement unit 132 for measuring an eye aperture of the output signal of the first demodulator 128; a second eye aperture measurement unit 134 for measuring an eye aperture of the output signal of the second demodulator 130; a comparator 135 for comparing the eye apertures measured by the first and second eye aperture measurement units 132 and 134; a switch 136 for connecting an output of one of the first and second demodulators 128 and 130 while disconnecting the other one in accordance with the result of comparison obtained by the comparator 135.

In this demodulation apparatus, a received input signal is distributed by the distributor 126 to the first and second demodulators 128 and 130. The first demodulator 128 incorporates the adaptive equalizer capable of compensating the communication path distortion due to the presence of multipath, and obtains a digital signal by demodulating the received input signal after the communication path distortion is compensated. On the other hand, the second demodulator 130 does not incorporate an adaptive equalizer, and obtains a digital signal by demodulating the received input signal directly.

Figure 7:
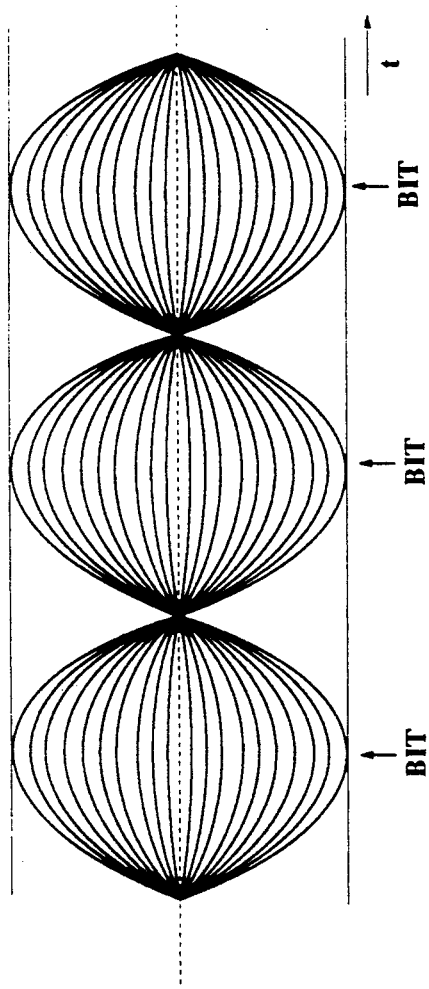
FIGS. 7(A) and 7(B) are illustrations of sequence diagram for cases of narrow and wide eye apertures, respectively.
Figure 7:
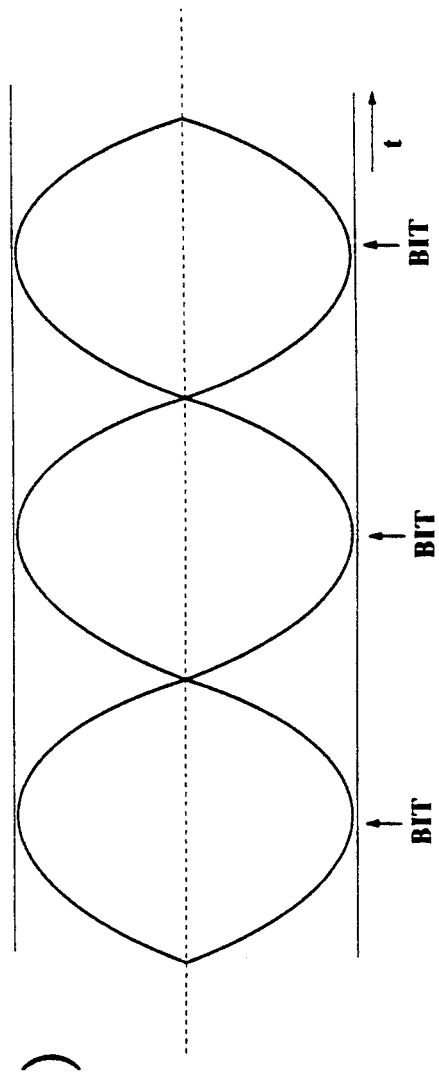

The first and second eye aperture measurement units 132 and 134 then measure the eye apertures of the output signals of the first and second demodulators 128 and 130. Here, the eye aperture is a quantity indicating how widely opened region is left out by the baseband signal sequence in a diagram in which the baseband signals are depicted as waveform patterns along a time axis scaled by the bit periods. Namely as shown in FIG. 7(A), in the presence of the multipath, the eye aperture tends to be narrower (smaller), whereas as shown in FIG. 7(B), in the absence of the multipath, the eye aperture tends to be wider (larger). Thus, by measuring the eye aperture, how much the received input signal is affected by the multipath can be assessed.

Figure 8:
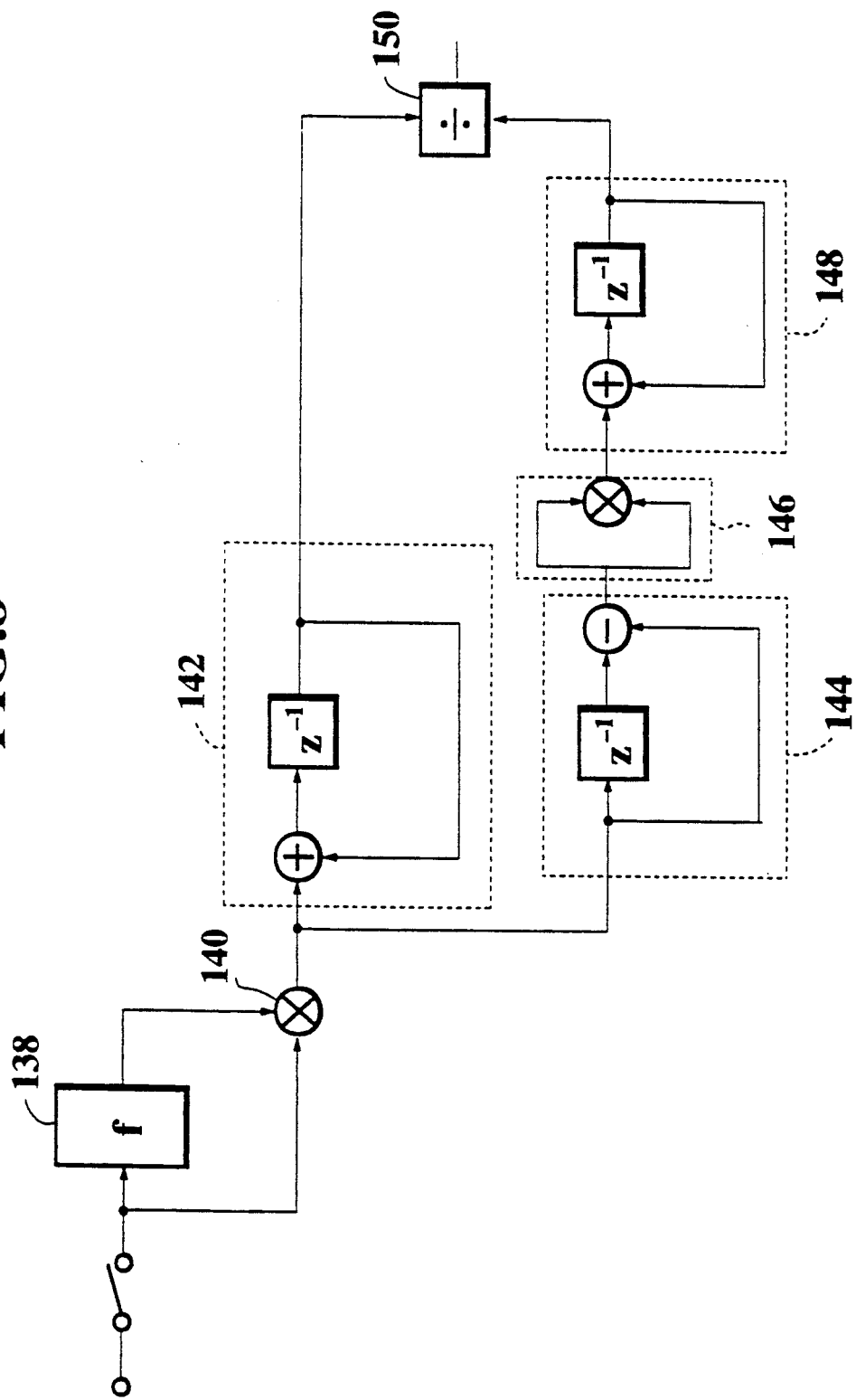
FIG. 8 is a detailed block diagram of an eye aperture measurement unit incorporated in the demodulation apparatus of FIG. 6.

Each of these first and second eye aperture measurement units 132 and 134 has a configuration as shown in FIG. 8. Namely, in each eye aperture measurement unit, a bit code of the input signal is judged by a judgement device 138 whose output result is multiplied by the input signal at a multiplier 140. Then, a first integrator 142 obtains an average signal level, while a neighboring signal difference extraction device 144, a self squaring device 146, and a second integrator 148 obtain an average noise level. Then, the obtained average signal level is divided by the obtained average noise level at a divider 150 to obtain the eye aperture. Here, by setting the integration period of the first and second integrators 142 and 148 to a burst period or a bit code block period of the input signal, the selection of the first and second demodulators 128 and 130 can be made at intervals of a period of the burst period or the bit code block period.

The eye aperture measured by the first and second eye aperture measurement units 132 and 134 are then compared by the comparator 135, which outputs a selection signal for controlling the switch 136, such that the first demodulator 128 is selected in a case the eye aperture measured by the first eye aperture measurement unit 132 is larger than the eye aperture measured by the second eye aperture measurement unit 134, and that the second demodulator 130 is selected otherwise, in order to connect the indicated one of the first and second demodulators 128 and 130 while disconnecting the other one.

This demodulation apparatus of the third embodiment has an advantage that the determination of the bit error rate is unaffected by a fading. Namely, the electric field strength of the received input signal becomes extremely low in a case of the flat fading in which it often occurs that the demodulation becomes impossible for the entire one burst period as the training sequence falls into the valley of the fading. In such a case of the flat fading, the demodulation can be performed more effectively by the differential detector of the demodulator alone, without the equalizer. Moreover, the differential detector can demodulate the data signal part alone even when the demodulation of the training signal part failed. Thus, in a case the equalizer fails to converge, more satisfactory bit error rate can be obtained by using the output of the differential detector in the demodulator without the equalizer.

Now, the occurrence of the flat fading can be detected by comparing the eye apertures of the outputs of the first and second demodulators 128 and 130 as described above. Namely, the eye aperture of the output from the equalizer never becomes large. In particular, when the high speed synchronization algorithm such as an RLS algorithm is used for the equalizer, the equalizer either converges or diverges completely, so that the eye aperture is narrow whenever the equalizer fails to converge. On the other hand, the eye aperture of the output of the differential detector is wide as long as the S/N ratio is sufficiently high and the multipath delay spread is not so large. On the other hand, when the multipath delay spread is rather large, it becomes less likely that the training sequence falls into a valley of the fading, so that the equalizer can operate properly. Thus, the occurrence of the flat fading can be detected by comparing the eye apertures of the outputs of the first and second demodulators 128 and 130, and the satisfactory bit error rate can be obtained consistently by selecting one of the first and second demodulators 128 and 130 which has the larger eye aperture.

It is to be noted that the inclusion of the differential detector in this embodiment only amounts to 1% increase of the hardware size, because the size of the hardware required for the tap coefficient modification algorithm for the equalizer in the mobile communication system such as the Kalman algorithm and the RLS algorithm is several tens of times greater than the hardware size of the differential detector. Thus, not much of the complication is introduced to the configuration of the demodulation apparatus in this embodiment.

Referring now to FIGS. 9 to 12, several variations of the third embodiment of the demodulation apparatus described above will be described.

Figure 9:
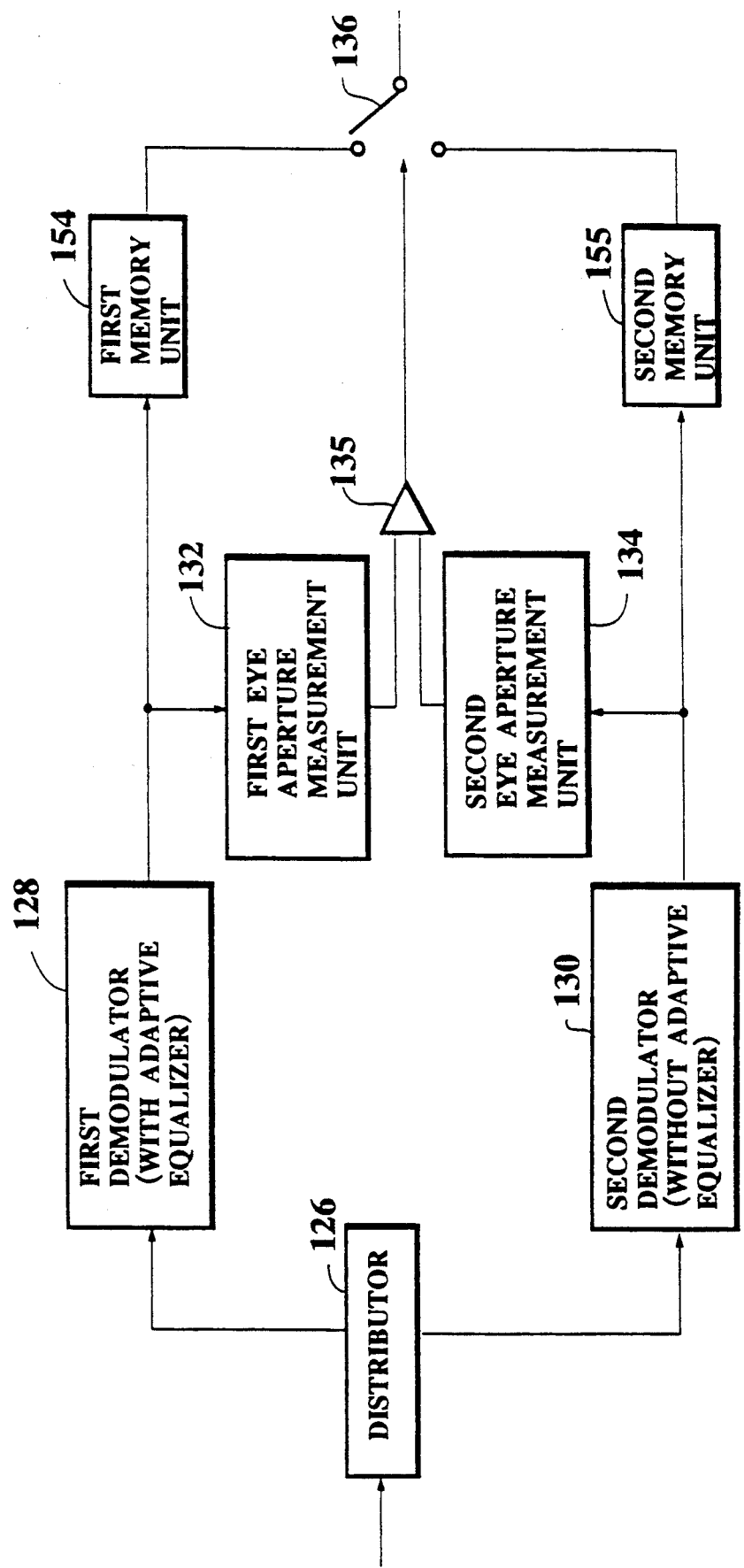
FIG. 9 is a schematic block diagram of one variation of the demodulation apparatus of FIG. 6.

First, as shown in FIG. 9, the third embodiment of FIG. 6 may be modified to further include the first and second memory units 154 and 155 between the switch 136 and each of the first and second demodulators 128 and 130, respectively. In this configuration of FIG. 9, the outputs of the first and second demodulators 128 and 130 are temporarily stored in the memory units 154 and 155 while the first and second eye aperture measurement units 132 and 134 measures the eye apertures. The output stored in one of the memory units 154 and 155 is then selected by the switch 136, as the comparator 135 controls the switch 136 according to the measured results of the eye apertures.

This configuration of FIG. 9 is capable of improving the reliability of the demodulation apparatus because the correspondence between the eye apertures and the reliability of the demodulated digital signals can be made rigorous. Here, it is preferable to take an average of the eye aperture over the entire range of the training sequence as the measured result of the eye aperture.

Secondly, the third embodiment of FIG. 6 may be modified such that a block FEC (feedforward error correction) is applied on the received input signal at a transmitter side. In this case, it is preferable to perform the measurement of the eye apertures in the bit code block period of the demodulated digital signal outputs from the first and second demodulators 128 and 130.

Figure 10:
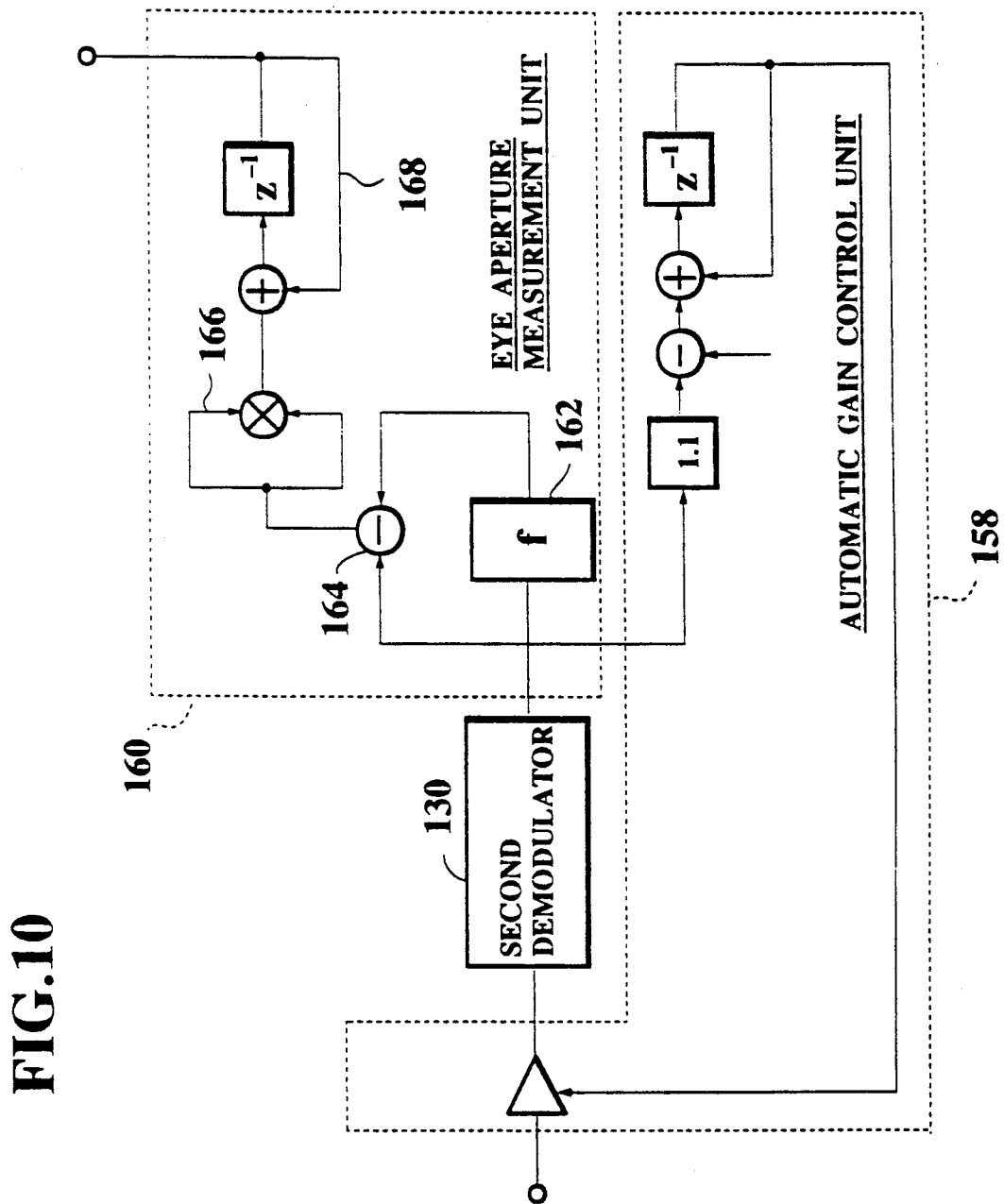
FIG. 10 is a detailed block diagram of an eye aperture measurement unit and an automatic gain control unit in another variation of the demodulation apparatus of FIG. 6.

Thirdly, as shown in FIG. 10, the third embodiment of FIG. 6 may be modified to further include an AGC (automatic gain control) unit 158 before the second demodulator 130, in which case the second eye aperture measurement unit 134 of FIG. 6 may be replaced by an eye aperture measurement unit 160 shown in FIG. 10. In this eye aperture measurement unit 160, a bit code of the input signal is judged by a judgement device 162 whose output result is subtracted from the input signal at a subtractor 164. Then, the eye aperture is obtained by a self squaring device 166, and an integrator 168 from the difference signal obtained by the subtractor 164. In this case, the output of the eye aperture measurement unit 160 becomes smaller when the eye aperture is larger.

Figure 11:
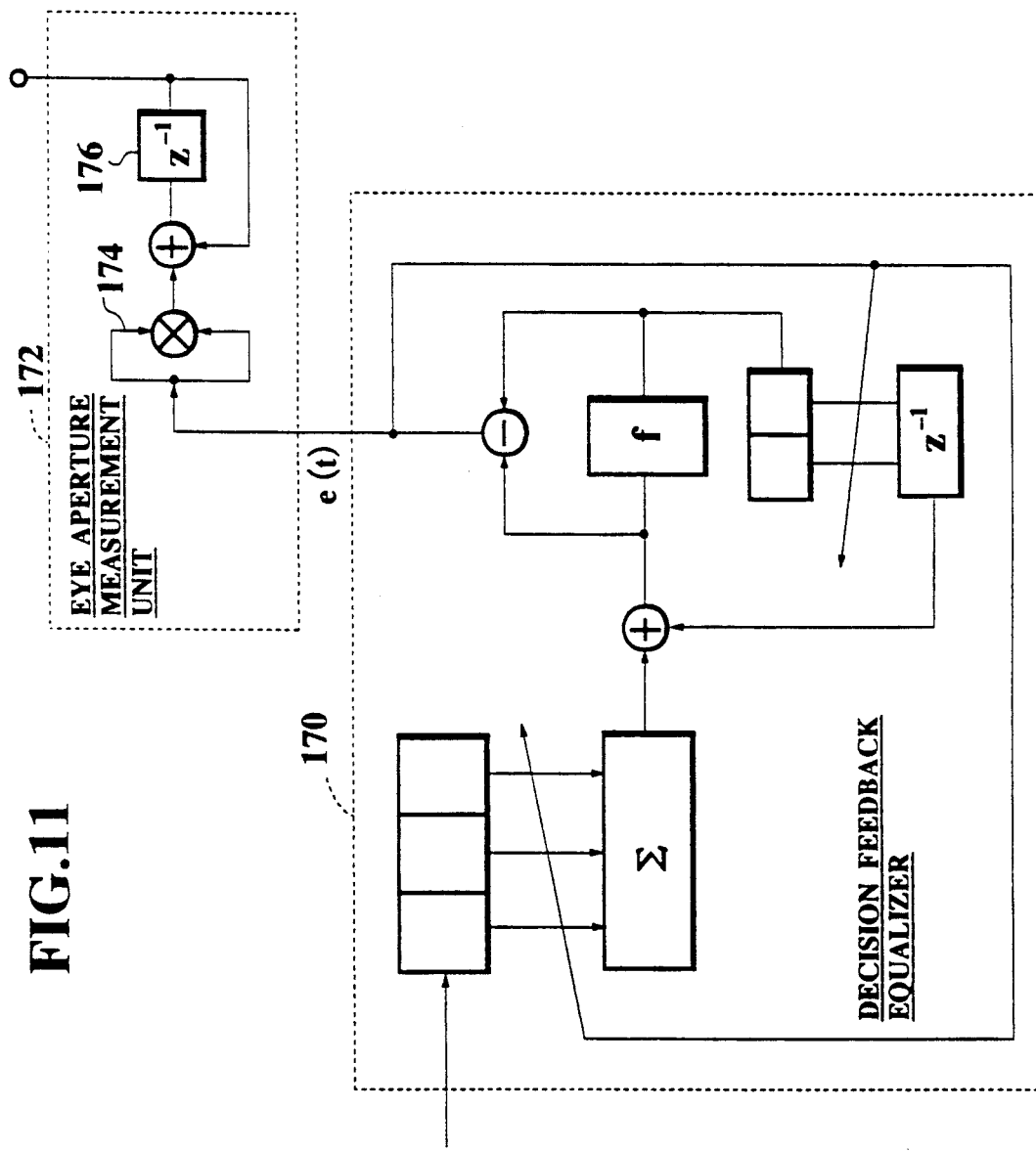
FIG. 11 is a detailed block diagram of an equalizer and an eye aperture measurement unit in another variation of the demodulation apparatus of FIG. 6.

Fourthly, as shown in FIG. 11, the first demodulator 128 of the third embodiment may includes a decision feedback equalizer 170 shown in FIG. 11, in which case the first eye aperture measurement unit 132 of FIG. 6 may be replaced by an eye aperture measurement unit 172 shown in FIG. 11. In this eye aperture measurement unit 172, the eye aperture is obtained by the self squaring device 174 and an integrator 176 from the error signal e(t) to be used for the tap coefficient modification for the decision feedback equalizer 170.

Figure 12:
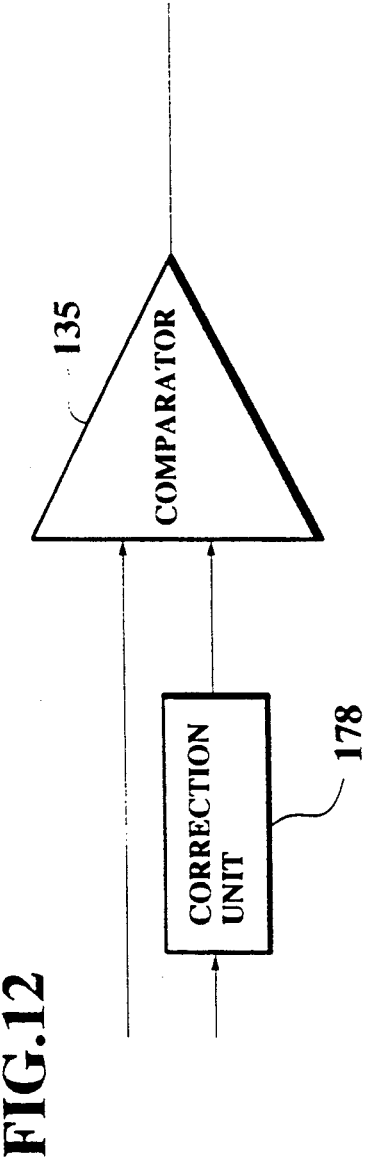
FIG. 12 is a diagram of a correction unit in another variation of the demodulation apparatus of FIG. 6.

Lastly, when the characteristics of the first and the second eye aperture measurement units are different, such as when the eye aperture measurement unit of FIG. 10 or FIG. 11 is used, such a difference of the characteristics may be compensated by incorporating, as shown in FIG. 12, a correction unit 178 before the comparator 135 for multiplying the signals with an appropriate set of correction coefficients, so as to obtain the minimum bit error rate. Here, such a correction unit 178 may be incorporated on one of the inputs for the comparator 135 as shown in FIG. 12, or on both of the inputs.

Figure 13:
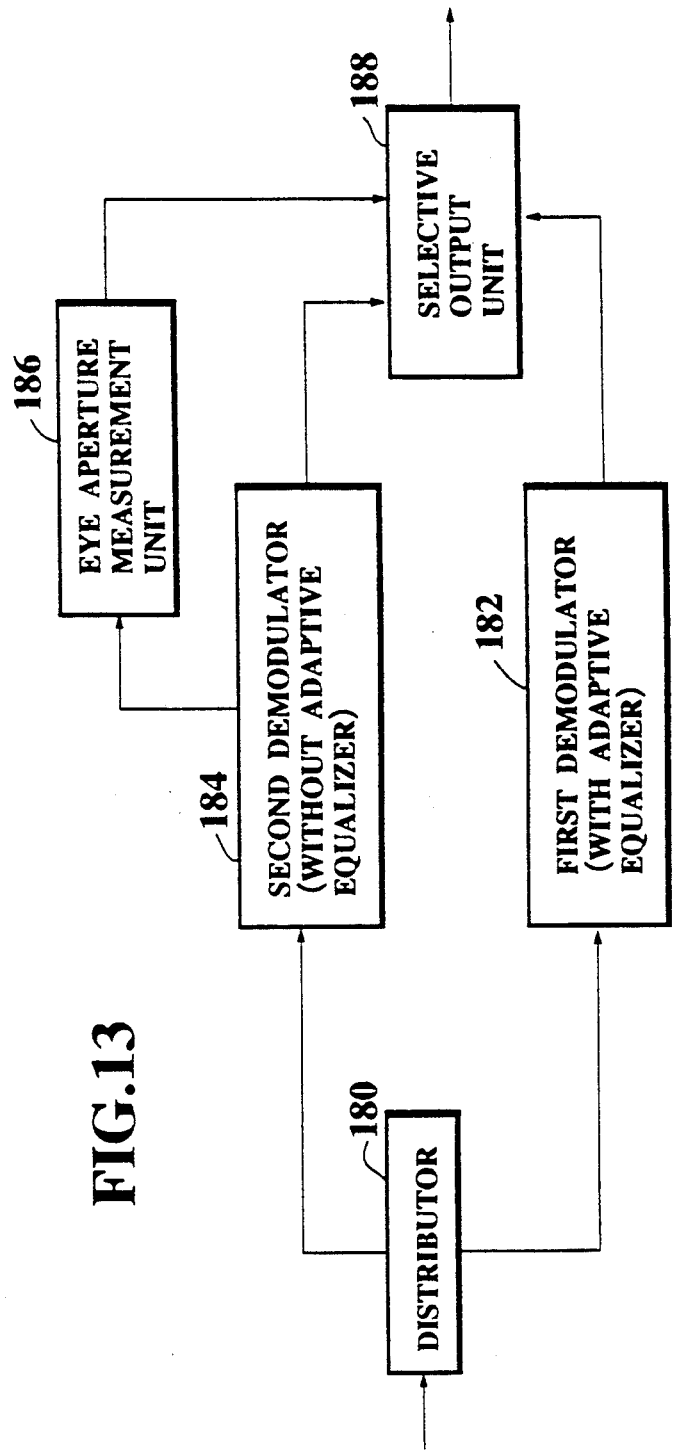
FIG. 13 is a schematic block diagram of a fourth embodiment of a demodulation apparatus according to the present invention.

Referring now to FIG. 13, a fourth embodiment of a demodulation apparatus according to the present invention will be described in detail.

In this embodiment, the demodulation apparatus comprises: a distributor 180 for distributing a received input signal into two passages; a first demodulator 182 incorporating an adaptive equalizer which is connected with one of the two passages coming from the distributor 180; a second demodulator 184 without an adaptive equalizer which is connected with the other one of the two passages coming from the distributor 180; an eye aperture measurement unit 186 for measuring an eye aperture of the output signal of the second demodulator 184; and a selective output unit 188 for selectively outputting one of the outputs of the first and second demodulators 182 and 184 by connecting an output of one of the first and second demodulators 182 and 184 while disconnecting the other one.

Here, the eye aperture measurement unit 186 is substantially equivalent to those of the previous embodiment which has a configuration shown in FIG. 8.

In this demodulation apparatus, a received input signal is distributed by the distributor 180 to the first and second demodulators 182 and 184. The first demodulator 182 incorporates the adaptive equalizer capable of compensating the communication path distortion due to the presence of multipath, and obtains a digital signal by demodulating the received input signal after the communication path distortion is compensated. On the other hand, the second demodulator 184 does not incorporate an adaptive equalizer, and obtains a digital signal by demodulating the received input signal directly.

The eye aperture measurement unit 186 then measure the eye apertures of the output signals of the second demodulators 184. The selective output unit 188 then compares the eye aperture measured by the eye aperture measurement units 186 with a prescribed threshold value, and selects one of the outputs from the first and second demodulators 182 and 184 according to the result of this comparison, such that the first demodulator 182 is selected in a case the eye aperture measured by the eye aperture measurement unit 186 is narrower than the prescribed threshold value, and that the second demodulator 184 is selected otherwise.

This demodulation apparatus of the fourth embodiment also has an advantage that the determination of the bit error rate is unaffected by a fading, just as the third embodiment described above.

Figure 14:
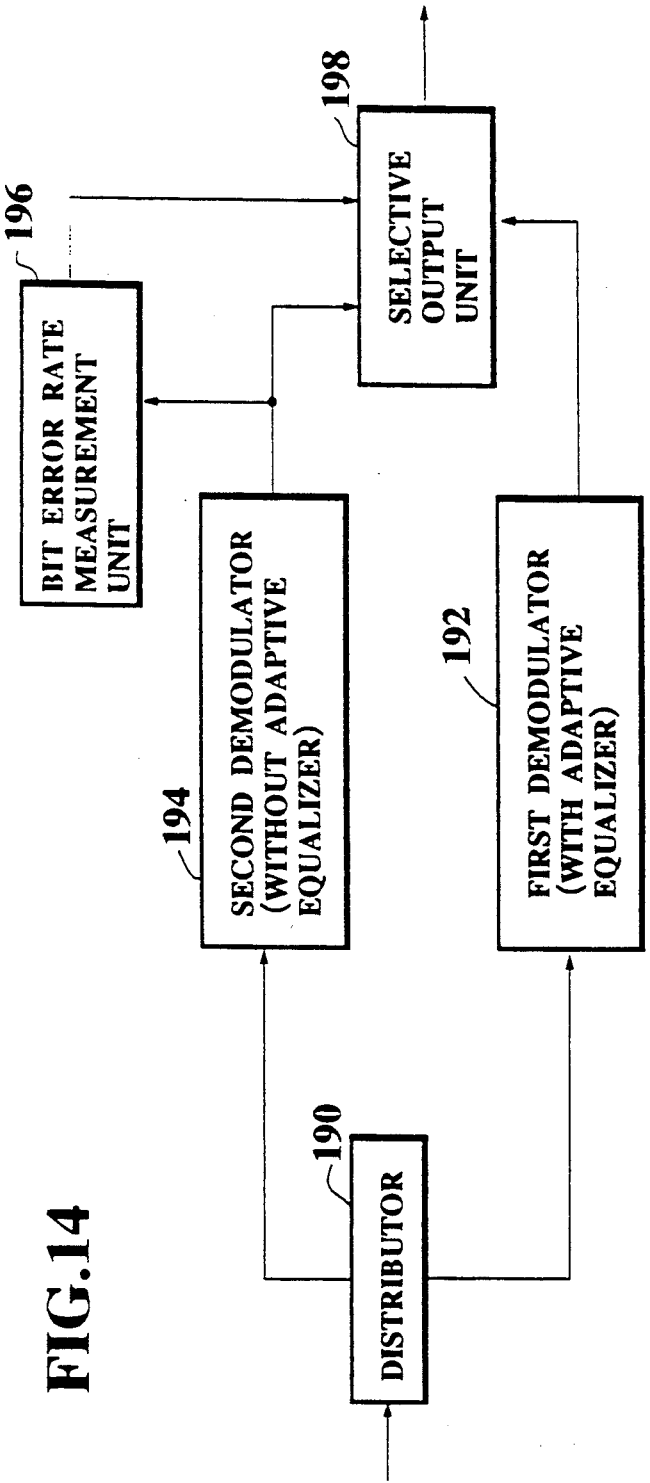
FIG. 14 is a schematic block diagram of a fifth embodiment of a demodulation apparatus according to the present invention.

Referring now to FIG. 14, a fifth embodiment of a demodulation apparatus according to the present invention will be described in detail.

In this embodiment, the demodulation apparatus comprises: a distributor 190 for distributing a received input signal into two passages; a first demodulator 192 incorporating an adaptive equalizer which is connected with one of the two passages coming from the distributor 190; a second demodulator 194 without an adaptive equalizer which is connected with the other one of the two passages coming from the distributor 190; a bit error rate measurement unit 196 for measuring a bit error rate of the output signal of the second demodulator 194; and a selective output unit 198 for selectively outputting one of the outputs of the first and second demodulators 192 and 194 by connecting an output of one of the first and second demodulators 192 and 194 while disconnecting the other one.

In this demodulation apparatus, a received input signal is distributed by the distributor 190 to the first and second demodulators 192 and 194. The first demodulator 192 incorporates the adaptive equalizer capable of compensating the communication path distortion due to the presence of multipath, and obtains a digital signal by demodulating the received input signal after the communication path distortion is compensated. On the other hand, the second demodulator 194 does not incorporate an adaptive equalizer, and obtains a digital signal by demodulating the received input signal directly.

Figure 15:
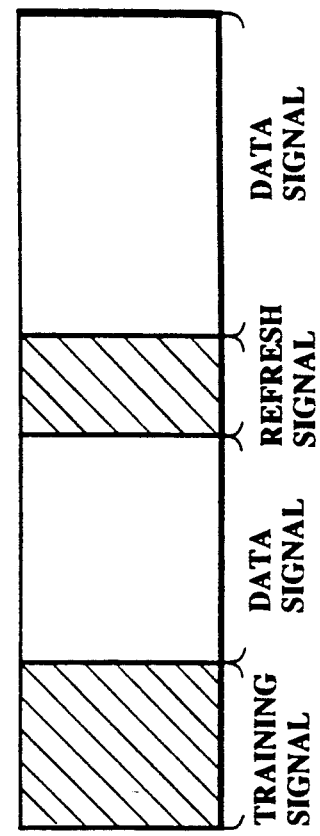
FIG. 15 is an illustration of an input data used in the demodulation apparatus of FIG. 14.

The bit error rate measurement unit 196 then measure the bit error rate of the output signals of the second demodulators 194. Now, when the received input signal is bursty, it contains the training signal as well as the refresh signal, as shown in FIG. 15, by which the equalizer is operated. Since these training signal and refresh signal are already known to be demodulators, so that the bit error rate measurement unit 196 measures the bit error rate of the first demodulator 192 for a predetermined number of burst periods using the known values of the training signal and the refresh signal.

The selective output unit 198 then compares the bit error rate measured by the bit error rate measurement unit 196 with a prescribed threshold value, and selects one of the outputs from the first and second demodulators 192 and 194 according to the result of this comparison, such that the first demodulator 192 is selected in a case the bit error rate measured by the bit error rate measurement unit 196 is greater than the prescribed threshold value and that the second demodulator 194 is selected otherwise.

This demodulation apparatus of the fifth embodiment also has an advantage that the determination of the bit error rate is unaffected by a fading, just as the third and fourth embodiments described above.

Figure 16:
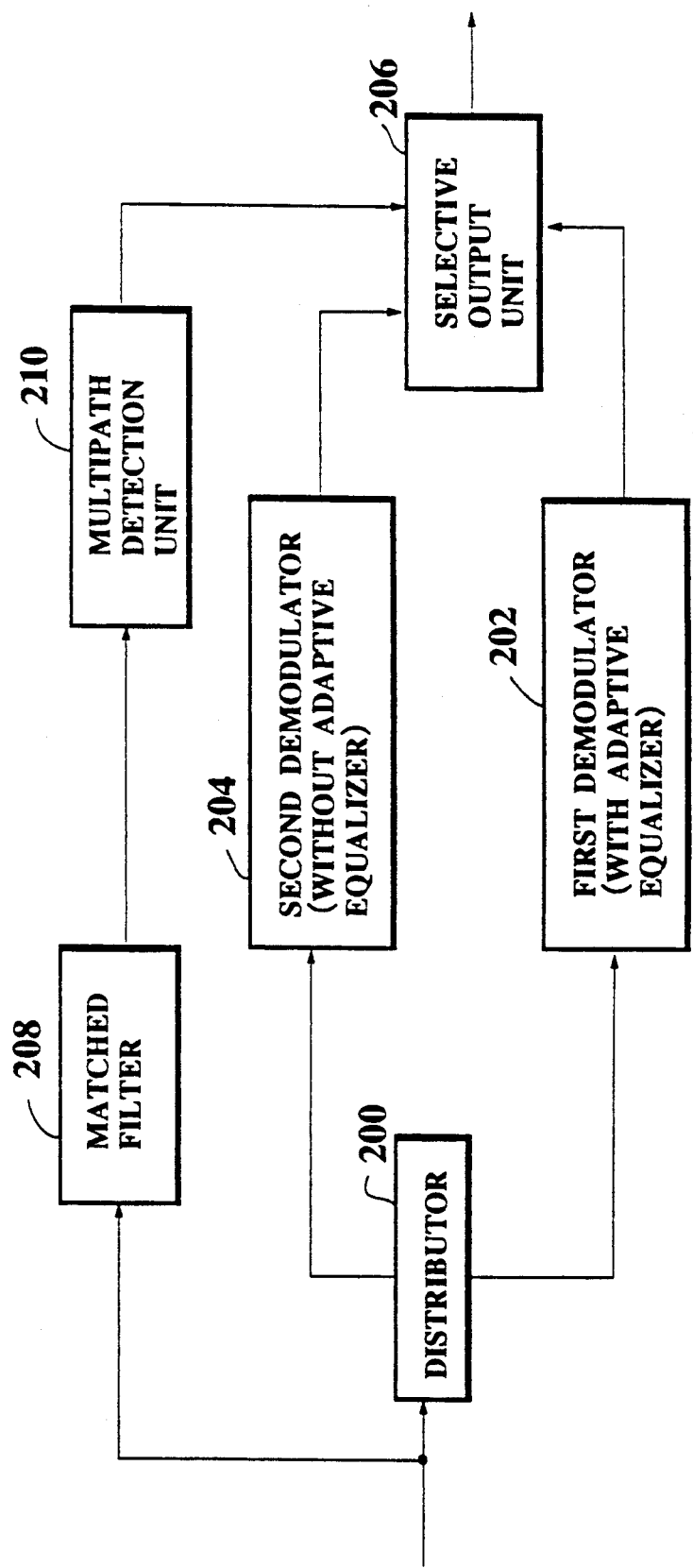
FIG. 16 is a schematic block diagram of a sixth embodiment of a demodulation apparatus according to the present invention.

Referring now to FIG. 16, a sixth embodiment of a demodulation apparatus according to the present invention will be described in detail.

In this embodiment, the demodulation apparatus comprises: a distributor 200 for distributing a received input signal into two passages; a first demodulator 202 incorporating an adaptive equalizer which is connected with one of the two passages coming from the distributor 200; a second demodulator 204 without an adaptive equalizer which is connected with the other one of the two passages coming from the distributor 200; a matched filter 208 for filtering the received input signal; a multipath detection unit 210 for detecting a presence of the multipath; and a selective output unit 206 for selectively outputting one of the outputs of the first and second demodulators 202 and 204 by connecting an output of one of the first and second demodulators 202 and 204 while disconnecting the other one.

In this demodulation apparatus, a received input signal is distributed by the distributor 200 to the first and second demodulators 202 and 204. The first demodulator 202 incorporates the adaptive equalizer capable of compensating the communication path distortion due to the presence of multipath, and obtains a digital signal by demodulating the received input signal after the communication path distortion is compensated. On the other hand, the second demodulator 204 does not incorporate an adaptive equalizer, and obtains a digital signal by demodulating the received input signal directly.

Figure 18:
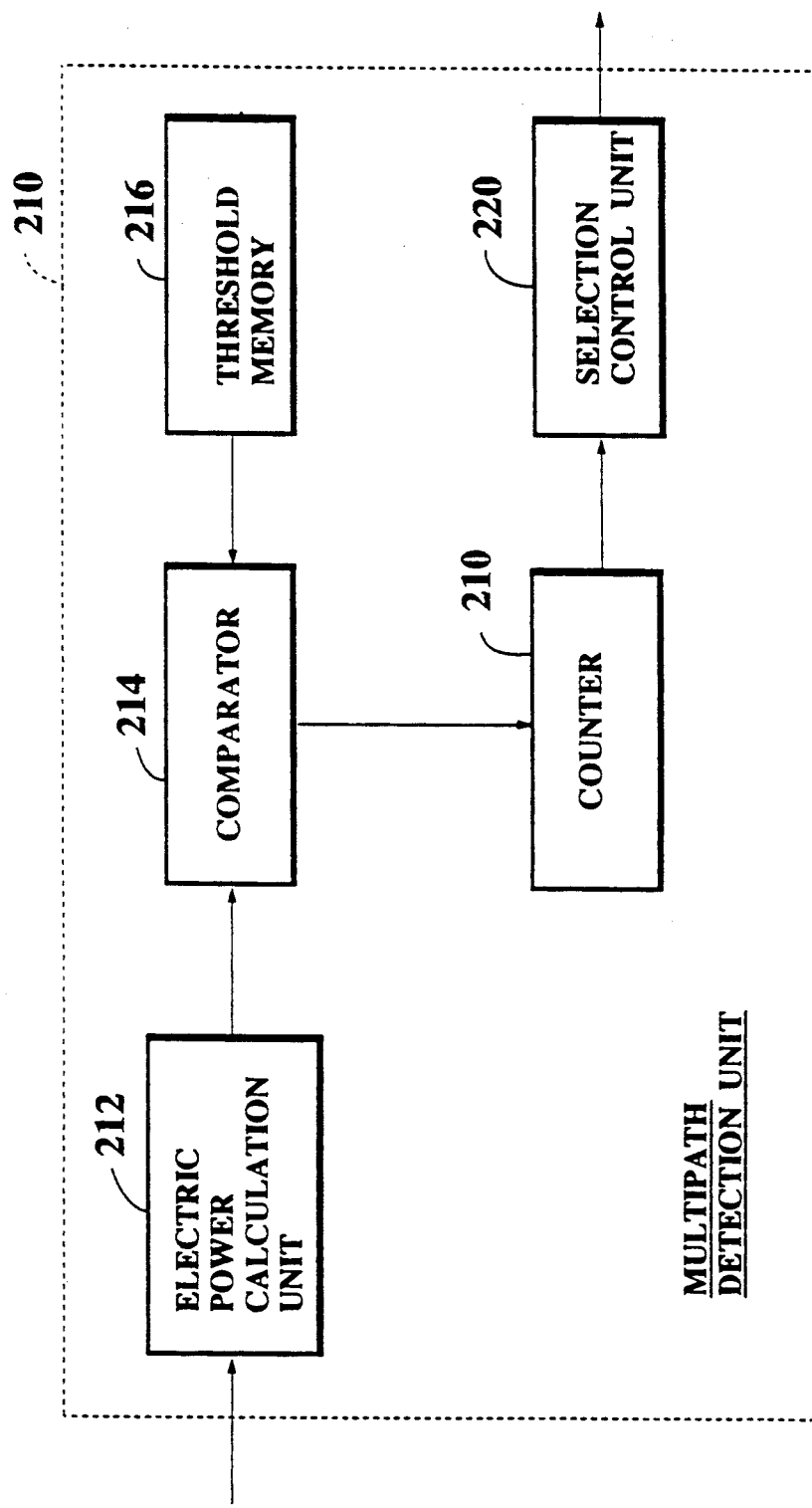
FIG. 18 is a detailed block diagram of a multipath detection unit incorporated in the demodulation apparatus of FIG. 16.

Meanwhile, the received input signal is also fed to the matched filter 208 which produces an impulse-like output signal shown in FIG. 17(A) when the multipath is absent, and a broader output signal shown in FIG. 17(B) when the multipath is present. This output signal of the matched filter 208 is fed to the multipath detection unit 210 which has a configuration shown in FIG. 18. Namely, the multipath detection unit 210 comprises: an electric power calculation unit 212 for calculating the electric power of the output signal received from the matched filter 208; a comparator 214 for comparing the calculated electric power with a prescribed threshold value stored in a threshold memory 216; a counter 218 whose count is increased by one whenever the result of comparison by the comparator 214 indicates that the calculated electric power is greater than the prescribed threshold value, such that this count can represent the multipath delay; and a selection control unit 220 for outputting a selection signal indicating the selection of the first demodulator 202 by judging that the the multipath is present when the count of the counter 218 is greater than a prescribed reference value, and outputting a selection signal indicating the selection of the second demodulator 204 by judging that the the multipath is absent when the count of the counter 218 is not greater than a prescribed reference value.

The selective output unit 206 then selects one of the outputs from the first and second demodulators 202 and 204 according to the selection signal from the multipath detection unit 210, such that the first demodulator 202 is selected in a case the multipath is judged to be present on a basis of the estimated multipath delay, and that the second demodulator 204 is selected otherwise.

This demodulation apparatus of the sixth embodiment also has an advantage that the determination of the bit error rate is unaffected by a fading, just as the third, fourth, fifth embodiments described above.

Figure 19:
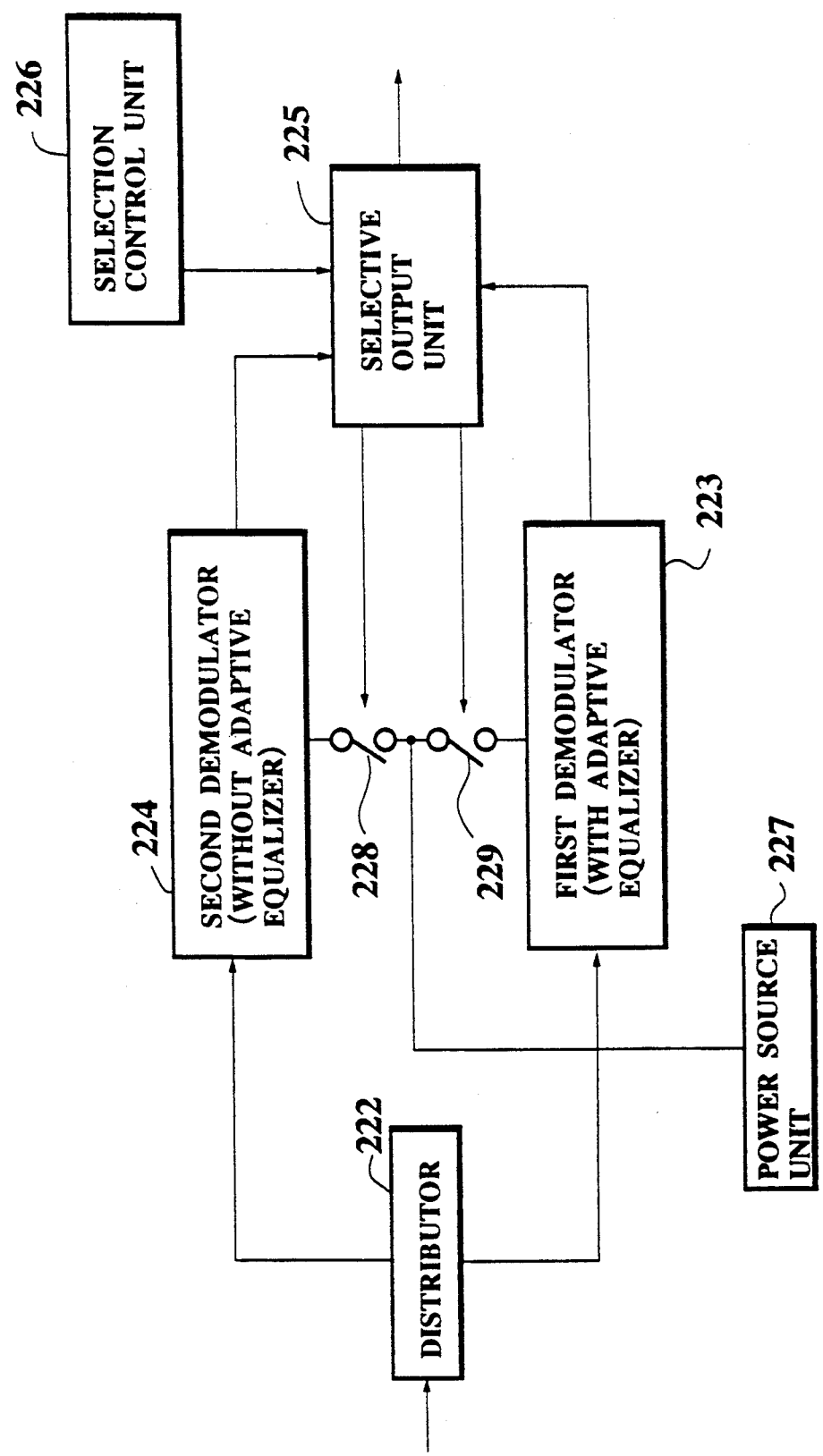
FIG. 19 is a schematic block diagram of a seventh embodiment of a demodulation apparatus according to the present invention.

Referring now to FIG. 19, a seventh embodiment of a demodulation apparatus according to the present invention will be described in detail.

In this embodiment, the demodulation apparatus comprises: a distributor 222 for distributing a bursty received input signal used in TDMA into two passages; a first demodulator 223 incorporating an adaptive equalizer which is connected with one of the two passages coming from the distributor 222; a second demodulator 224 without an adaptive equalizer which is connected with the other one of the two passages coming from the distributor 222; a selective output unit 225 for selectively outputting one of the outputs of the first and second demodulators 223 and 224 by connecting an output of one of the first and second demodulators 223 and 224 while disconnecting the other one; a selection control unit 226 for controlling the selective output unit 225; a power source unit 227 for supplying operation power to the first and second demodulators 223 and 224; and a first and a second switches 228 and 229 for connecting or disconnecting the power source unit 227 with the first and second demodulators 223 and 224, respectively, in accordance with the selection made by the selective output unit 225.

In a case the first and second demodulators 223 and 224 are formed by CMOS made by using the digital signal processing technology, the clock supplies can be disconnected according to the selection control. Such a clock supply control can be used instead of the power supply control, for the same effect.

Here, the selection control unit 226 may be any one of the eye aperture measurement unit 186 of the fourth embodiment shown in FIG. 13, the bit error rate measurement unit 196 of the fifth embodiment shown in FIG. 14, and the multipath detection unit 210 of the sixth embodiment shown in FIG. 16. Alternatively, the selection control unit 226 may have a configuration shown in FIG. 20, in which the conjugate of output of the first demodulator 223 obtained by a conjugate circuit 230 is multiplied at a multiplier 231 with the received input signal delayed by a delay 235a and then fed through a low pass filter 232a and a power measuring unit 237a to a subtractor 233, while the conjugate of the output of the second demodulator 224 obtained by a conjugate circuit 234 is multiplied at a multiplier 236 with the received input signal delayed by a delay 235b and then fed through a low pass filter 232b and a power measuring unit 237b to the subtractor 233, such that the selective output unit 225 is controlled by a control signal determined in accordance with a difference calculated by the subtractor 233.

In this demodulation apparatus, a received input signal is distributed by the distributor 222 to the first and second demodulators 223 and 224. The first demodulator 223 incorporates the adaptive equalizer capable of compensating the communication path distortion due to the presence of multipath, and obtains a digital signal by demodulating the received input signal after the communication path distortion is compensated. On the other hand, the second demodulator 224 does not incorporate an adaptive equalizer, and obtains a digital signal by demodulating the received input signal directly.

The selective output unit 225 selects one of the outputs from the first and second demodulators 223 and 224 according to the selection signal from the selection control unit 226. In addition, the selective output unit 225 controls the first and second switches 228 and 229 such that when the first demodulator 223 is selected at least nine times in the first ten bursts, for example, the first switch 228 is opened for the following period of a prescribed number of bursts, such as the period of the next one hundred bursts, to stop the supply of the operation power to the second demodulator 224 and to use the first demodulator 223 only, during this period of time, whereas when the second demodulator 224 is selected at least nine times in the first ten bursts, for example, the second switch 229 is opened for the following period of a prescribed number of bursts, such as the period of the next one hundred bursts, to stop the supply of the operation power to the first demodulator 223 and to use the second demodulator 224 only, during this period of time, while otherwise both of the first and second switches 228 and 229 are closed so that for each burst the selective output unit 225 makes the selection between the first and second demodulators 223 and 224.

This demodulation apparatus of the seventh embodiment has an advantage that the wasteful consumption of the power source unit 227 can be reduced without affecting the bit error rate, as the power source unit 227 is disconnected from one of the first and second demodulators 223 and 224 when it is judged that this one of the first and second demodulators 223 and 224 is unnecessary.

Figure 21:
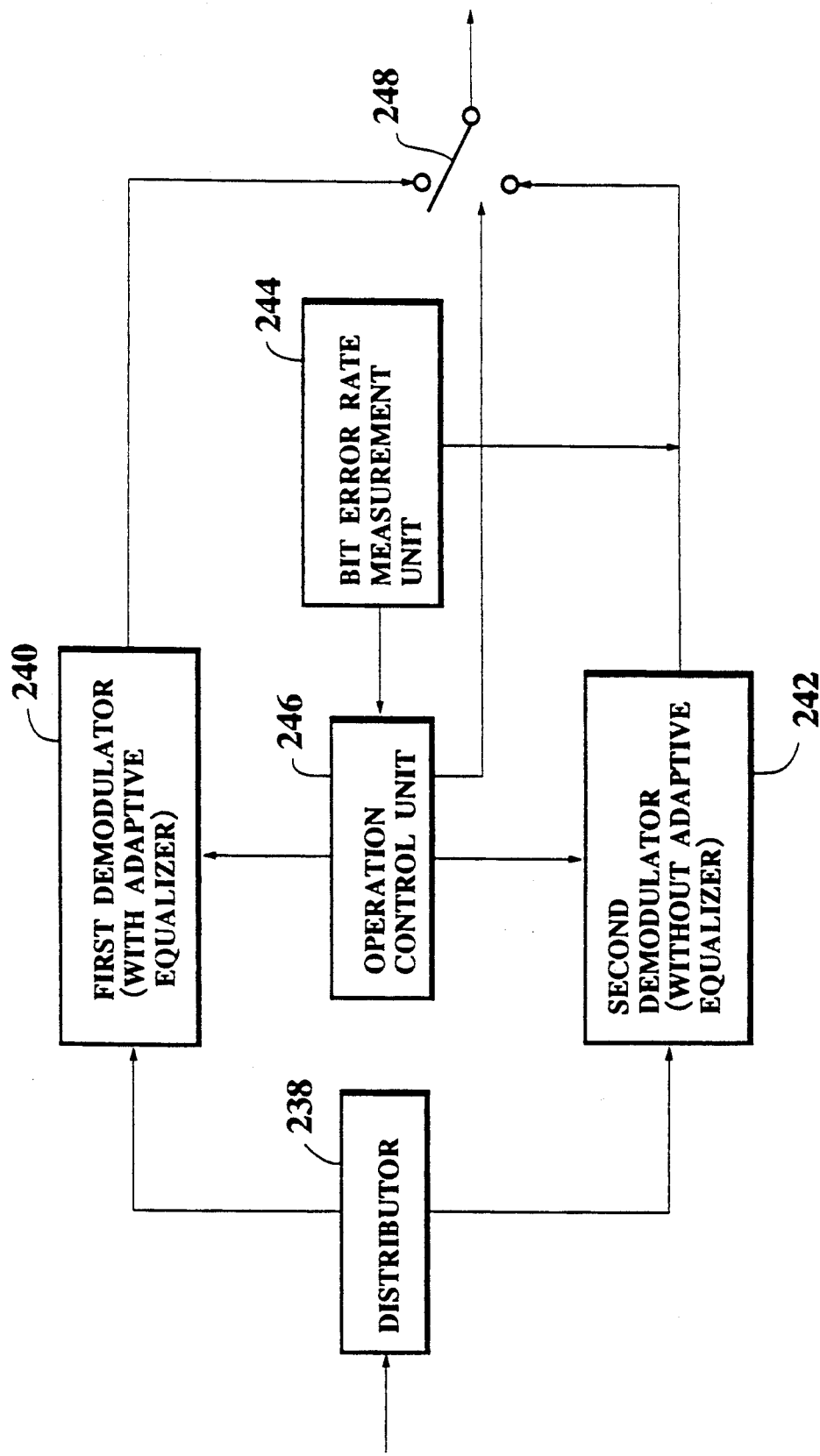
FIG. 21 is a schematic block diagram of an eighth embodiment of a demodulation apparatus according to the present invention.

Referring now to FIG. 21, an eighth embodiment of a demodulation apparatus according to the present invention will be described in detail.

In this embodiment, the demodulation apparatus comprises: a distributor 238 for distributing a received input signal including a training signal into two passages; a first demodulator 240 incorporating an adaptive equalizer which is connected with one of the two passages coming from the distributor 238; a second demodulator 242 without an adaptive equalizer which is connected with the other one of the two passages coming from the distributor 238; a bit error rate measurement unit 244 for measuring a bit error rate of the output signal of the second demodulator 242; an operation control unit 246 for controlling the operations of the first and second demodulators 240 and 242; and a switch 248 for connecting an output of one of the first and second demodulators 240 and 242 while disconnecting the other one according to the control by the operation control unit 246.

In this demodulation apparatus, a received input signal is distributed by the distributor 238 to the first and second demodulators 240 and 242. The first demodulator 240 incorporates the adaptive equalizer capable of compensating the communication path distortion due to the presence of multipath, and obtains a digital signal by demodulating the received input signal after the communication path distortion is compensated. On the other hand, the second demodulator 242 does not incorporate an adaptive equalizer, and obtains a digital signal by demodulating the received input signal directly.

While receiving the training signal, the output of the second demodulator 242 is fed to the bit error rate measurement unit 244 which measures the bit error rate of the output of the second demodulator 242, and determines whether the bit error rate becomes greater than a prescribed threshold value NE during the training period. When the bit error rate becomes lower than the prescribed threshold value NE consecutively for a prescribed period of time D, the bit error rate measurement unit 244 outputs a selection signal indicating the selection of the second demodulator 242 to the operation control unit 246, whereas otherwise, the bit error rate measurement unit 244 outputs a selection signal indicating the selection of the first demodulator 240 to the operation control unit 246. In other words, the quality of service resulting from the use of the second demodulator 242 is judged by the bit error rate measurement unit 244 according to the bit error rate during the training period.

The operation control unit 246 controls the first and second demodulators 240 and 242 such that both of the first and second demodulators 240 and 242 are operated during the training period. During the data period following the training period, when the selection of the second demodulator 242 is indicated by the selection signal from the bit error rate measurement unit 244, the operation of the second demodulator 242 is continued while the operation of the first demodulator 240 is terminated, whereas when the selection of the first demodulator 240 is indicated by the selection signal from the bit error rate measurement unit 244, the operation of the first demodulator 240 is continued while the operation of the second demodulator 242 is terminated. In a case the first and second demodulators 240 and 242 are formed by using CMOS, such a termination of the operation of one of the first and second demodulators 240 and 242 can be furnished by shutting off the clock signal for one of the first and second demodulators 240 and 242. Otherwise, such a termination of the operation of one of the first and second demodulators 240 and 242 can be furnished by shutting off the power supply for one of the first and second demodulators 240 and 242.

The switch 248 connects the first demodulator 240 when the first demodulator 240 is operated by the operation control unit 246 during the data period, and the second demodulator 242 when the second demodulator 242 is operated by the operation control unit 246 during the data period.

Figure 22:
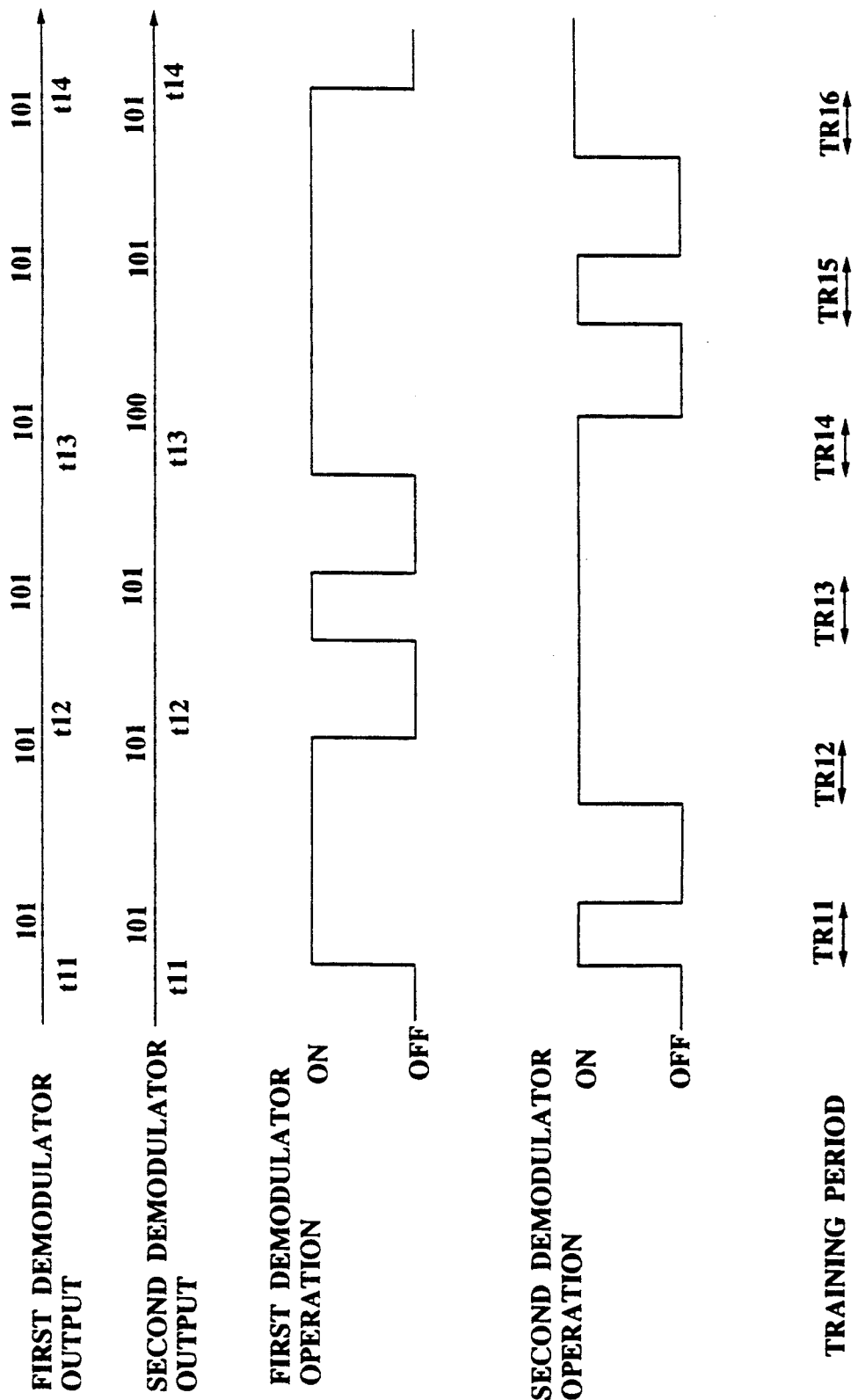
FIG. 22 is a timing chart for outputs and operations of first and second demodulators in the demodulation apparatus of FIG. 21.

An example of timing relationship among the received input signal, the operations of the first and second demodulators 240 and 242, and their outputs are shown in FIG. 22. In this example, the training signal in a form of "101" is used, the prescribed period of time D is taken to be equal to two training periods, and for simplicity the bit error rate is either 0 which is to be considered below the prescribed threshold value NE, or 1 which is to be considered over the prescribed threshold value NE.

In this example, at a time t11, the received input signal is entered into the distributor 238 and distributed to the first and second demodulators 240 and 242.

During the first training period TR11 starting from the time t11, both of the first and second demodulators 240 and 242 are operating. At this point, the outputs of the first and second demodulators 240 and 242 are both "101" so that the bit error rate is 0, and because the bit error rate 0 is measured only once, i.e., not yet twice consecutively, the bit error rate measurement unit 244 outputs the selection signal indicating the selection of the first demodulator 240. Accordingly, in the data period following the first training period TR11, the first demodulator 240 remains in operation while the operation of the second demodulator 242 is terminated.

During the second training period TR12, both of the first and second demodulators 240 and 242 are operated again. At this point, the outputs of the first and second demodulators 240 and 242 are both "101" so that the bit error rate is 0 again. Now, because the bit error rate 0 is measured twice consecutively, the bit error rate measurement unit 244 outputs the selection signal indicating the selection of the second demodulator 242. Accordingly, in the data period following the second training period TR12 which starts from a time t12, the second demodulator 242 remains in operation while the operation of the first demodulator 240 is terminated.

During the third training period TR13, both of the first and second demodulators 240 and 242 are operated again. At this point, the outputs of the first and second demodulators 240 and 242 are both "101" so that the bit error rate is 0 again. Here again, the bit error rate 0 is measured twice consecutively, so that the bit error rate measurement unit 244 outputs the selection signal indicating the selection of the second demodulator 242. Accordingly, in the data period following the third training period TR13, the second demodulator 242 remains in operation while the operation of the first demodulator 240 is terminated.

During the fourth training period TR14 starting from a time t13, both of the first and second demodulators 240 and 242 are operated again. At this point, the output of the first demodulator 240 is "101" but the output of the second demodulator 242 is "100" so that the bit error rate becomes 1. As a result, the bit error rate 0 is not measured twice consecutively at this point, so that the bit error rate measurement unit 244 outputs the selection signal indicating the selection of the first demodulator 240. Accordingly, in the data period following the fourth training period TR14, the first demodulator 240 remains in operation while the operation of the second demodulator 242 is terminated.

During the fifth training period TR15, both of the first and second demodulators 240 and 242 are operated again. At this point, the outputs of the first and second demodulators 240 and 242 are both "101" so that the bit error rate is 0 again. However, because the bit error rate 0 is not measured twice consecutively, the bit error rate measurement unit 244 still outputs the selection signal indicating the selection of the second demodulator 242. Accordingly, in the data period following the fifth training period TR15, the first demodulator 240 remains in operation again while the operation of the second demodulator 242 is terminated.

During the sixth training period TR16, both of the first and second demodulators 240 and 242 are operated again. At this point, the outputs of the first and second demodulators 240 and 242 are both "101" so that the bit error rate is 0 again. Now, the bit error rate 0 is measured twice consecutively, so that the bit error rate measurement unit 244 outputs the selection signal indicating the selection of the second demodulator 242. Accordingly, in the data period following the sixth training period TR16 which starts from a time t14, the second demodulator 242 remains in operation while the operation of the first demodulator 240 is terminated.

Similarly, in the subsequent operation, both of the first and second demodulators 240 and 242 are operated in each training period, and the second demodulator 242 continues to remain in operation until the bit error rate 1 is obtained again while the first demodulator 240 is operated only during the training periods.

This demodulation apparatus of the eighth embodiment has an advantage that the wasteful consumption of the operation power of the first and second demodulators 240 and 242 can be reduced without affecting the bit error rate, as only one of the first and second demodulators 240 and 242 are operated during the data signal receiving period while the operation of the other one of the first and second demodulators 240 and 242 is terminated.

Figure 23:
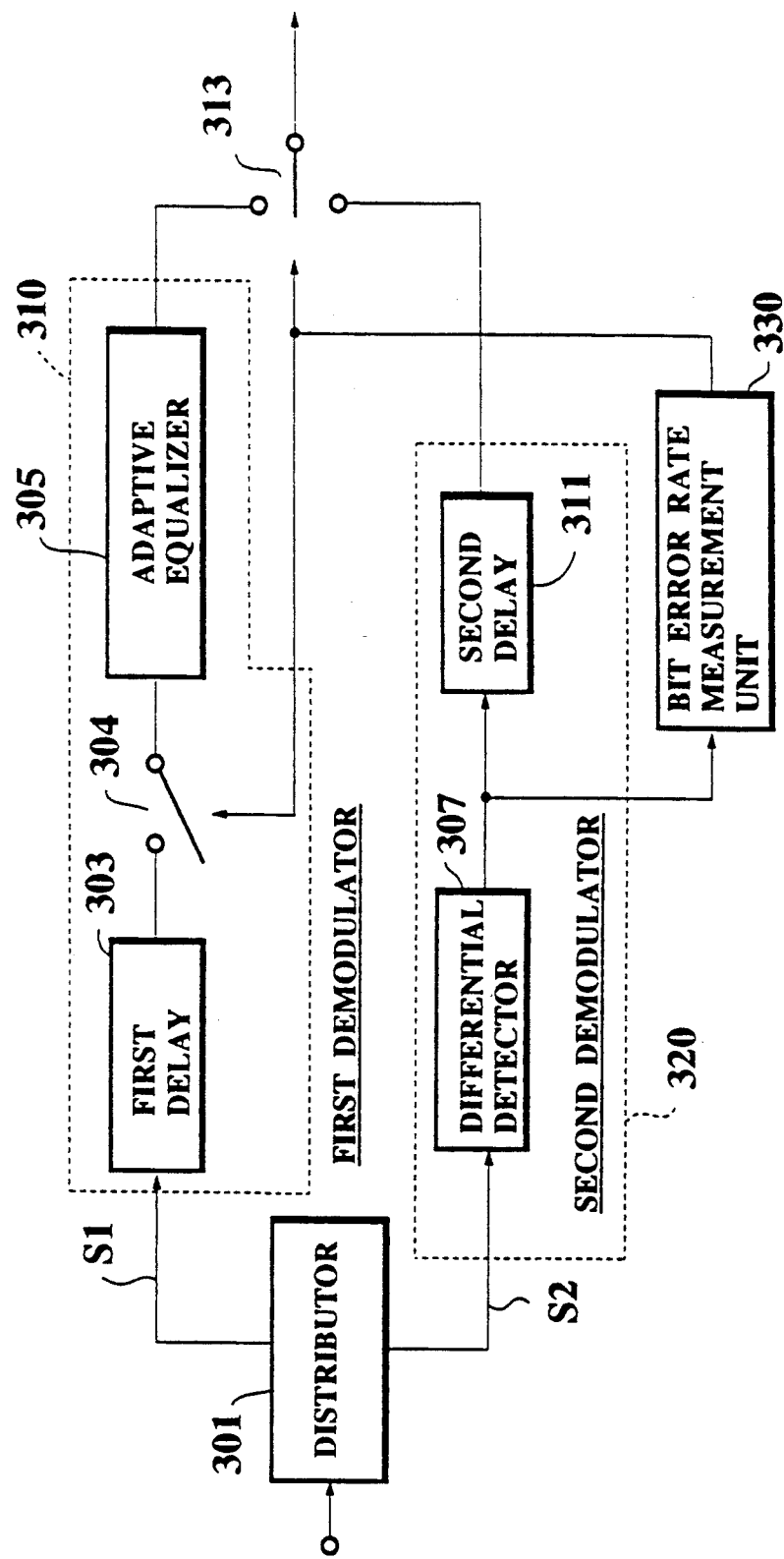
FIG. 23 is a schematic block diagram of a ninth embodiment of a demodulation apparatus according to the present invention.

Referring now to FIG. 23, a ninth embodiment of a demodulation apparatus according to the present invention will be described in detail.

In this embodiment, the demodulation apparatus comprises: a distributor 301 for distributing a received input signal into two passages S1 and S2; a first demodulator 310 incorporating an adaptive equalizer 305 which is connected with a passage S1 coming from the distributor 301 through a first delay 303 and a first switch 304 placed between the first delay 303 and the adaptive equalizer 305; a second demodulator 320 without an adaptive equalizer which incorporates a differential detector 307 connected with another passage S2 coming from the distributor 301, and a second delay 311 through which the data part of the output of the differential detector 307 is outputted; a second switch 313 for selectively connecting one of the outputs of the first and second demodulators 310 and 320 while disconnecting the other one; and a bit error rate measurement unit 330 for measuring a bit error rate of from the training part of the output of the differential detector 307, and controlling the first and second switches 304 and 313 according to the measured bit error rate.

In this demodulation apparatus, a received input signal is distributed by the distributor 301 to the first and second demodulators 310 and 320. The first demodulator 310 incorporates the adaptive equalizer 305 capable of compensating the communication path distortion due to the presence of multipath, and obtains a digital signal by demodulating the received input signal after the communication path distortion is compensated. On the other hand, the second demodulator 320 does not incorporate an adaptive equalizer, in which the differential detector 307 obtains a digital signal by demodulating the received input signal directly.

The first delay 303 delays the transmission of the received input signal by a period longer than the training period of the received input signal, while the second delay 311 delays the transmission of the output of the differential detector 307 by a period of time taken by the adaptive equalizer 305 in equalizing the received input signal and by the bit error measurement. These first and second delays 303 and 311 have the effect of synchronizing timings of the outputs of the first and second demodulators 310 and 320.

Figure 24:
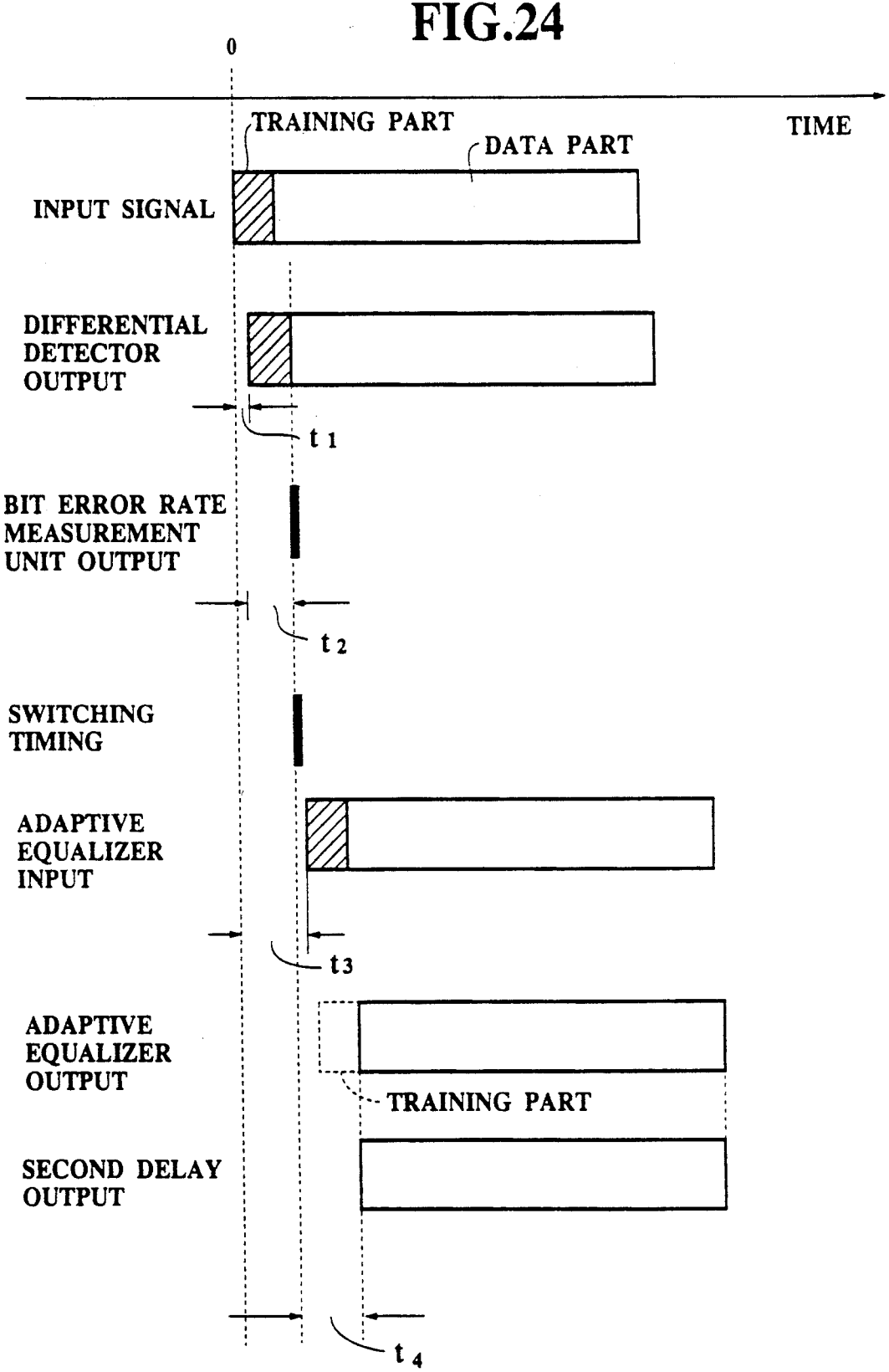
FIG. 24 is a timing chart for various inputs and outputs in the demodulation apparatus of FIG. 23.

Namely, as shown in FIG. 24, for the received input signal including the training signal and the data signal, the output of the differential detector 307 is outputted after a period of time t1, and the output of the bit error rate measurement unit 330 is outputted after a period of time t2 from the timing of the output of the differential detector 307 which is the timing of switching the switches 304 and 313. The first delay 303 delays the transmission of the received input signal by a period of time t3 which is longer than a sum of the periods t1 and t2, such that the received input data are given to the adaptive equalizer 305 after the switch 304 was controlled by the bit error rate measurement unit 330. Thus, when the second demodulator 320 is selected by the bit error rate measurement unit 330, the received input signal is not entered into the adaptive equalizer 305. When the first demodulator 310 is selected, the output of the adaptive equalizer 305 which is without the training part is outputted after a period of time t4 from the timing of switching, so that the second delay 311 delays the output of the data part of the output of the second demodulator 320 by this period t4 such that the outputs from the first and second demodulators 310 and 320 are outputted to the switch 313 simultaneously.

The bit error rate measurement unit 330 then measure the bit error rate of the output signal of the differential detector 307 by comparing the training signal demodulated by the differential detector 307 with the already known training signal, and controls the switch 313 in order to select one of the outputs from the first and second demodulators 310 and 320 according to the measured bit error rate. In a case the second demodulator 320 is selected, the bit error rate measurement unit 330 also controls the switch 304 to disconnect the adaptive equalizer 305, so as to save the power consumption by the adaptive equalizer 305 while its output is not used.

Thus, this demodulation apparatus of the ninth embodiment has an advantage that the power consumption of the apparatus can be reduced, because the operation of the adaptive equalizer is limited only to cases where its output is to be used.

Figure 25:
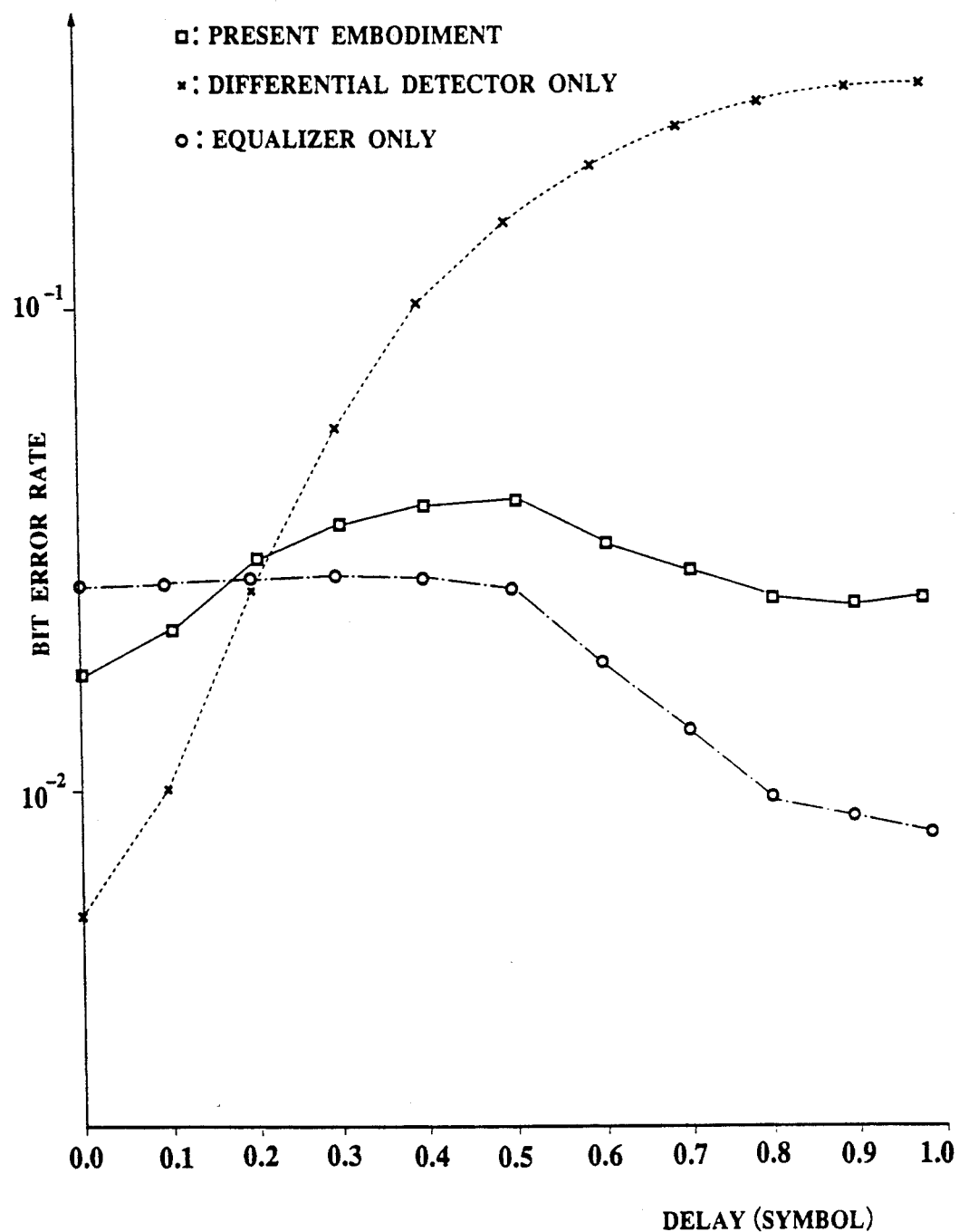
FIG. 25 is a graph of a bit error rate as a function of a delay interval, for the demodulation apparatus of FIG. 23, for the demodulation apparatus using only an equalizer, and for the demodulation apparatus using only a differential detector.
Figure 26:
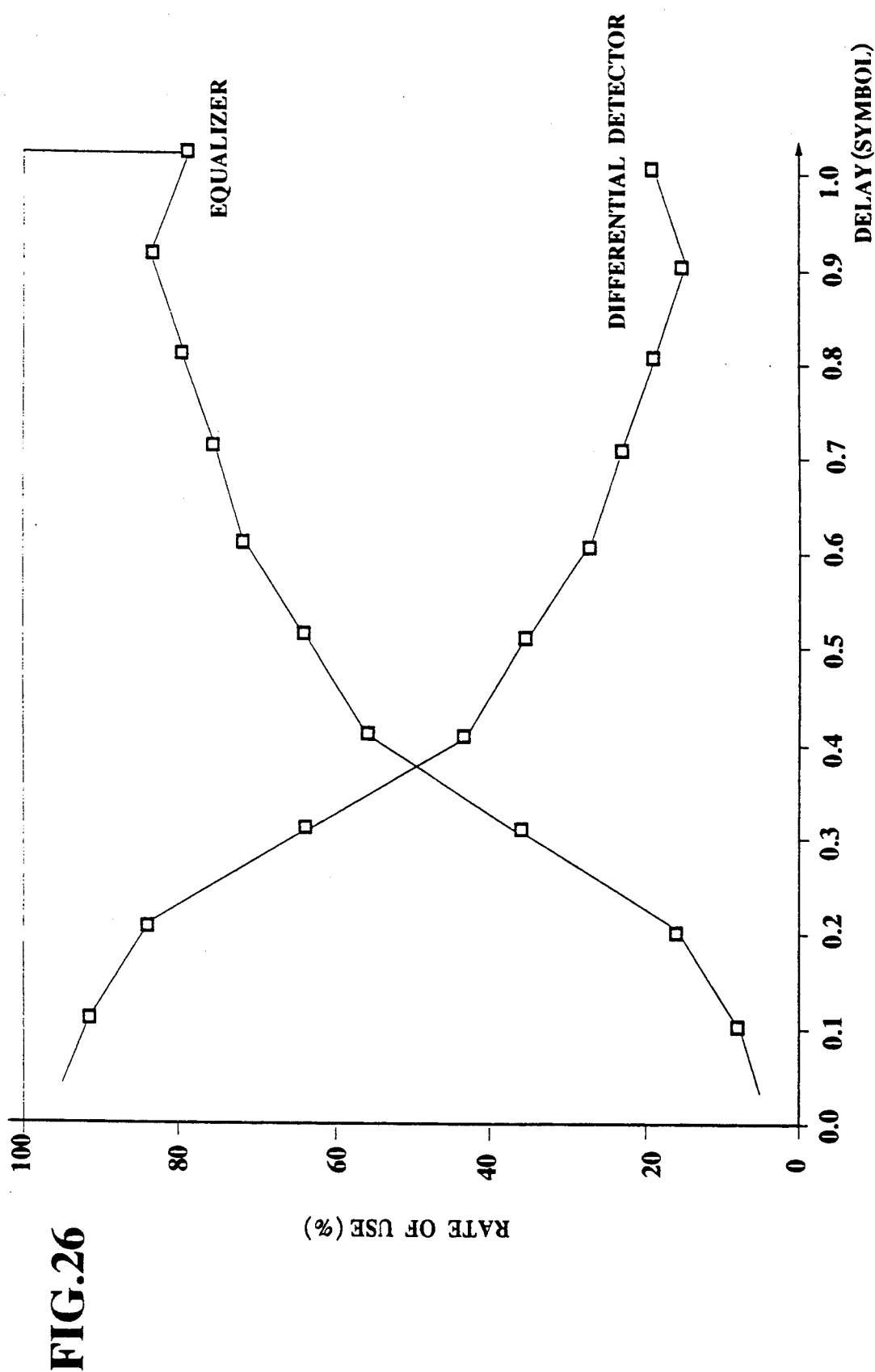
FIG. 26 is a graph of a rate of use of an equalizer and a differential detector as a function of a delay interval, for the demodulation apparatus of FIG. 23.

The results concerning the bit error rate and selection rates for the first and second demodulators obtained by the simulation of this embodiment are shown in FIGS. 25 and 26, respectively, where the simulation had been performed under the following conditions.

transmission path model: two ray Rayleigh fading path
(where each ray has independent Rayleigh fading)
multipath size: one symbol interval delay
$E_b/N_\phi$:20 dB
DU ratio: 0 dB
fading frequency: 1/1000 of the transmission speed
clock phase displacement: none
carrier offset: none FIG. 25 shows the result for the bit error rate as a function of the delay interval. In FIG. 25, the bit error rate obtained by the apparatus of the ninth embodiment is shown by a solid line. For the purpose of comparison, the result obtained by using the adaptive equalizer alone is shown by a single dot chain line while the result obtained by using the differential detector alone is shown by a dashed line. As can be seen from FIG. 25, the apparatus of the ninth embodiment can reduce the bit error rate over the entire range of the delay interval, such that the sufficiently low bit error rate can be realized consistently.

FIG. 26 shows the result for the selection rates of the first and second demodulators 310 and 320, i.e., how often each of the first and second demodulators 310 and 320 is selected for a given delay interval. As can be seen from FIGS. 25 and 26, for the small delay interval, i.e., a case of less multipath, although the adaptive equalizer 305 is not operated for over 95% of times, the bit error rate obtained for such a delay interval is better than the case of using the adaptive equalizer alone. On the other hand, for the large delay interval, i.e., a case of more multipath, although the bit error rate becomes somewhat higher than the case of using the adaptive equalizer alone, because the adaptive equalizer 305 is operated for only about 80% of times, so that the significant saving of the power consumption can be realized.

Now, one example of more detailed configuration for the demodulation apparatus according to the ninth embodiment will be described with reference to FIG. 27.

Figure 27:
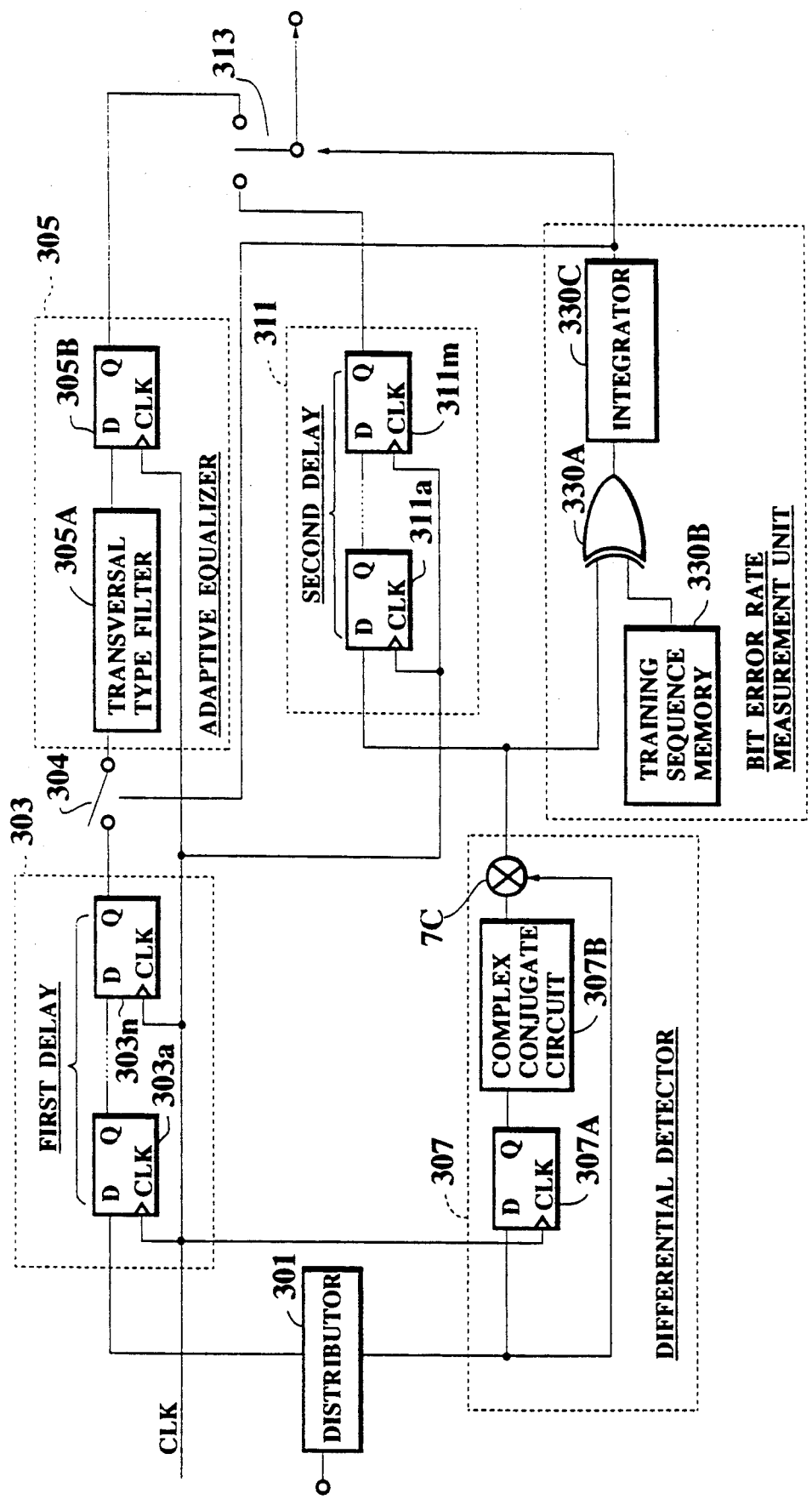
FIG. 27 is a detailed block diagram of one example of a configuration for the demodulation apparatus of FIG. 23.

In this demodulation apparatus of FIG. 27, the first delay 303 comprises a plurality of shift registers 303a to 303n which are connected in series, while the adaptive equalizer 305 comprises a transversal type filter 305A and a shift register 305B. On the other hand, the second delay 307 comprises a shift register 307A, a complex conjugate circuit 307B, and a multiplier 307C, such that the complex conjugate of the signal delayed at the shift register 307A is obtained by the complex conjugate circuit 307B and the obtained complex conjugate is multiplied with the next input signal at the multiplier 307C in order to obtain the demodulated signal. Also, the second delay 311 comprises a plurality of shift registers 311a to 311m which are connected in series, while the bit error rate measurement unit 330 comprises a modulo 2 sum circuit (EXOR gate) 330A for taking a sum of modulo 2 of the training sequence demodulated by the differential detector 307 and the known training sequence stored in the training sequence memory 330B, and an integrator 330C.

Figure 28:
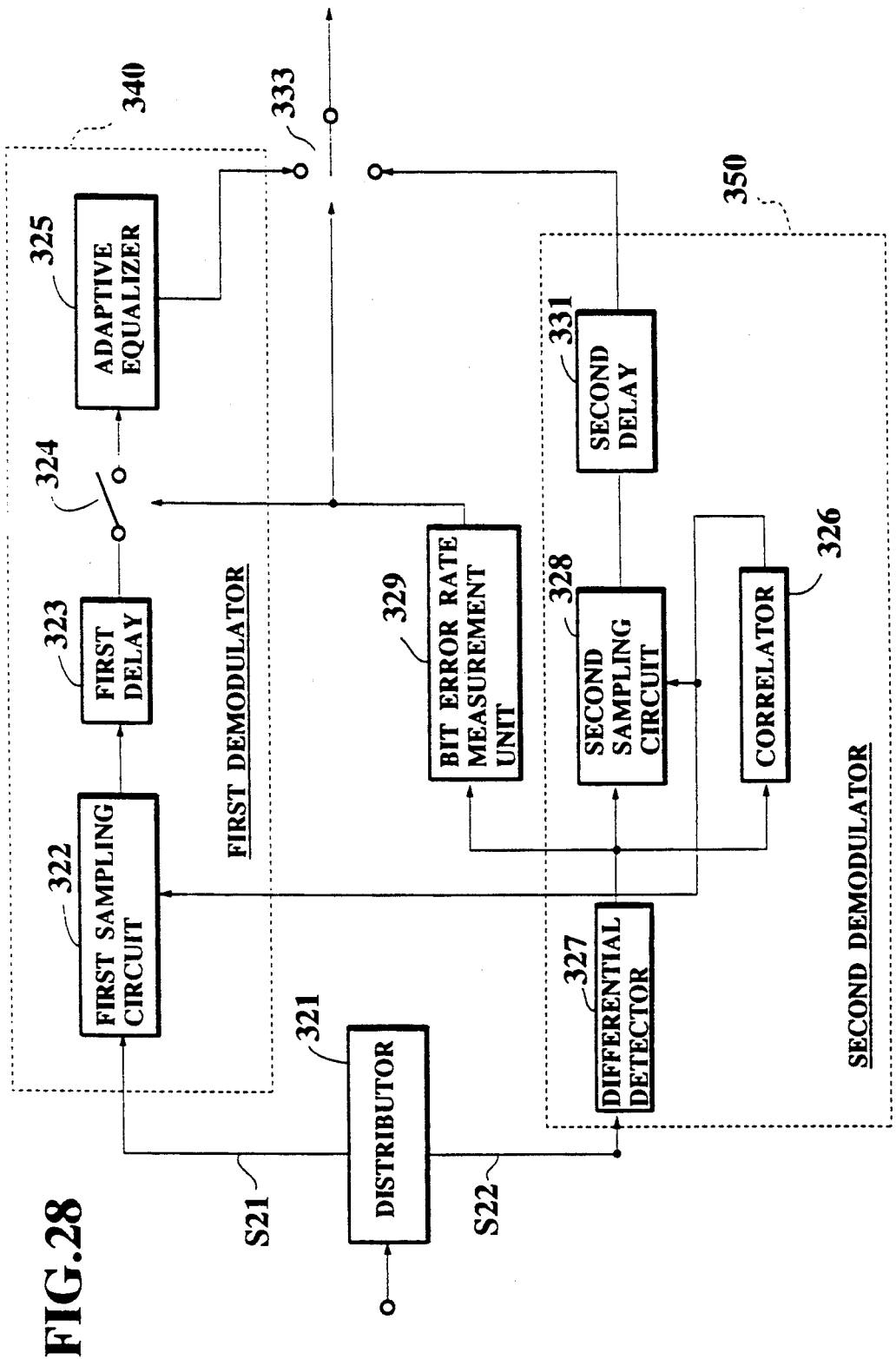
FIG. 28 is a schematic block diagram of a tenth embodiment of a demodulation apparatus according to the present invention.

Referring now to FIG. 28, a tenth embodiment of a demodulation apparatus according to the present invention will be described in detail.

In this embodiment, the demodulation apparatus comprises: a distributor 321 for distributing a received input signal into two passages S21 and S22; a first demodulator 340 incorporating an adaptive equalizer 325 which is connected with a passage S21 coming from the distributor 321 through a first sampling circuit 322, a first delay 323, and a first switch 324; a second demodulator 350 without an adaptive equalizer which incorporates a differential detector 327 connected with another passage S22 coming from the distributor 321, a second sampling circuit 328, a second delay 311 through which the data part of the output of the differential detector 327 is outputted, and a correlator 326 formed by an FIR filter which uses the complex conjugates of the differentially decoded training sequence as the tap coefficients; a second switch 333 for selectively connecting one of the outputs of the first and second demodulators 340 and 350 while disconnecting the other one; and a bit error rate measurement unit 329 for measuring a bit error rate of from the training part of the output of the differential detector 327, and controlling the first and second switches 324 and 333 according to the measured bit error rate.

In this demodulation apparatus, a received input signal is distributed by the distributor 321 to the first and second demodulators 340 and 350. The first demodulator 340 incorporates the adaptive equalizer 325 capable of compensating the communication path distortion due to the presence of multipath, and obtains a digital signal by demodulating the received input signal after the communication path distortion is compensated. On the other hand, the second demodulator 350 does not incorporate an adaptive equalizer, in which the differential detector 327 obtains a digital signal by demodulating the received input signal directly.

The first delay 323 delays the transmission of the received input signal by a period longer than the training period of the received input signal, while the second delay 331 delays the transmission of the output of the differential detector 327 by a period of time taken by the adaptive equalizer 325 in equalizing the received input signal. These first and second delays 323 and 331 have the effect of synchronizing timings of the outputs of the first and second demodulators 340 and 350, as in the ninth embodiment described above.

The bit error rate measurement unit 329 then measure the bit error rate of the output signal of the differential detector 327 by comparing the training signal demodulated by the differential detector 327 with the already known training signal, and controls the switch 333 in order to select one of the outputs from the first and second demodulators 340 and 350 according to the measured bit error rate. In a case the second demodulator 350 is selected, the bit error rate measurement unit 329 also controls the switch 324 to disconnect the adaptive equalizer 325, so as to save the power consumption by the adaptive equalizer 325 while its output is not used.

Thus, this demodulation apparatus of the tenth embodiment also has an advantage that the power consumption of the apparatus can be reduced, just as in the ninth embodiment described above.

In addition, in this embodiment, the demodulation apparatus differs from that of the ninth embodiment described above in that the first demodulator 340 further includes the first sampling circuit 322, while the second demodulator 350 further includes the correlator 326 and the second sampling circuit 328. With these additional elements, the output of the differential detector 327 is also entered into the correlator 326 which takes a correlation of the training sequence demodulated by the differential detector 327 and the already known training sequence, and provides optimal sampling clock timings to the first and second sampling circuits 322 and 328 by using a time of the maximum correlation as a reference point, such that the sampling of the received input signal by the first sampling circuit 322 and the sampling of the output of the differential detector 327 by the second sampling circuit can be performed optimally.

Figure 29:
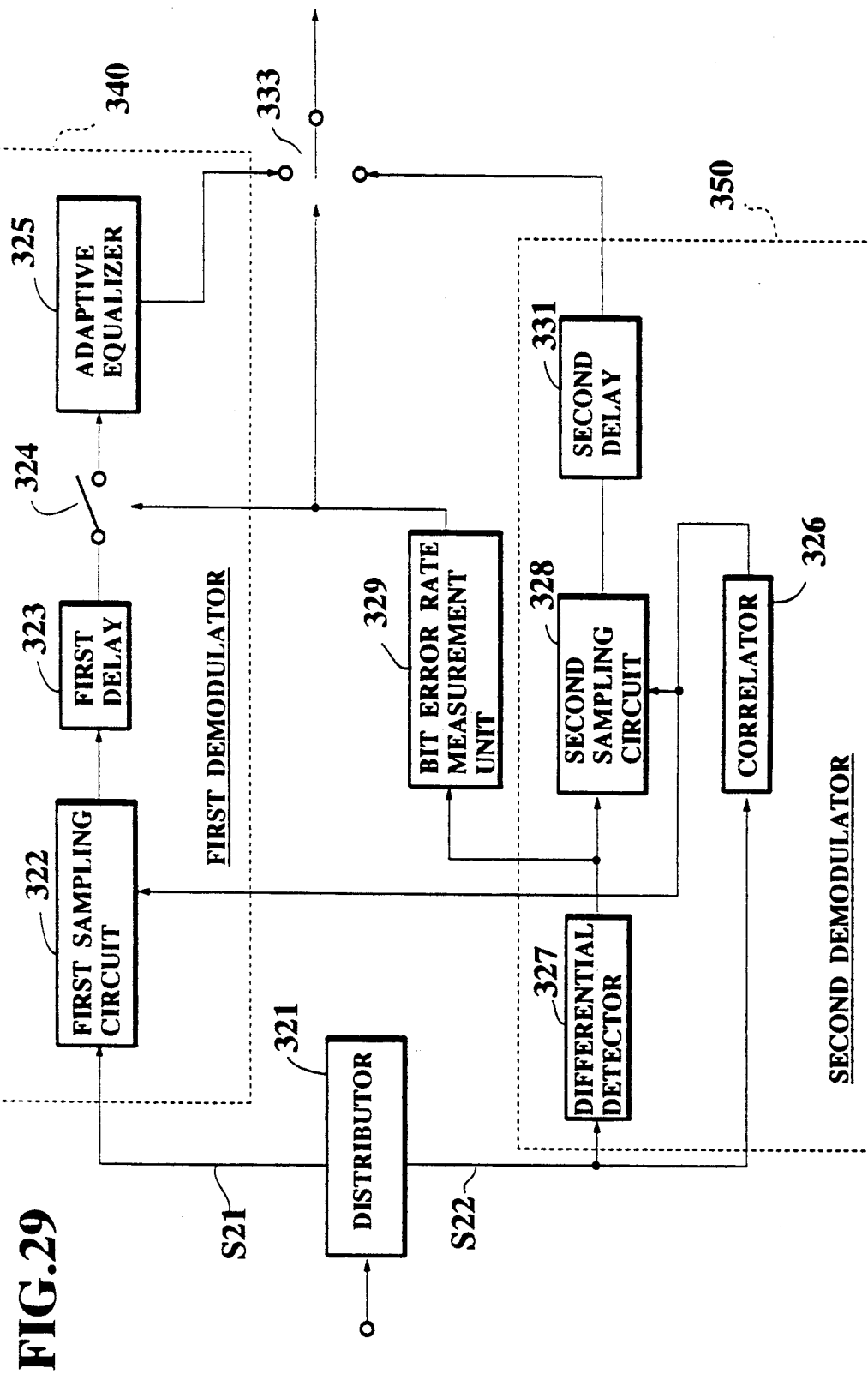
FIG. 29 is a schematic block diagram of one variation of the demodulation apparatus of FIG. 28.

It is to be noted that the configuration of FIG. 28 may be modified as shown in FIG. 29, such that instead of feeding the output of the differential detector 327 as an input for the correlator 326, the received input signal distributed by the distributor is used as the input for the correlator 326. The tap coefficient of the correlator is the conjugate of the absolute value of the training sequence.

Figure 30:
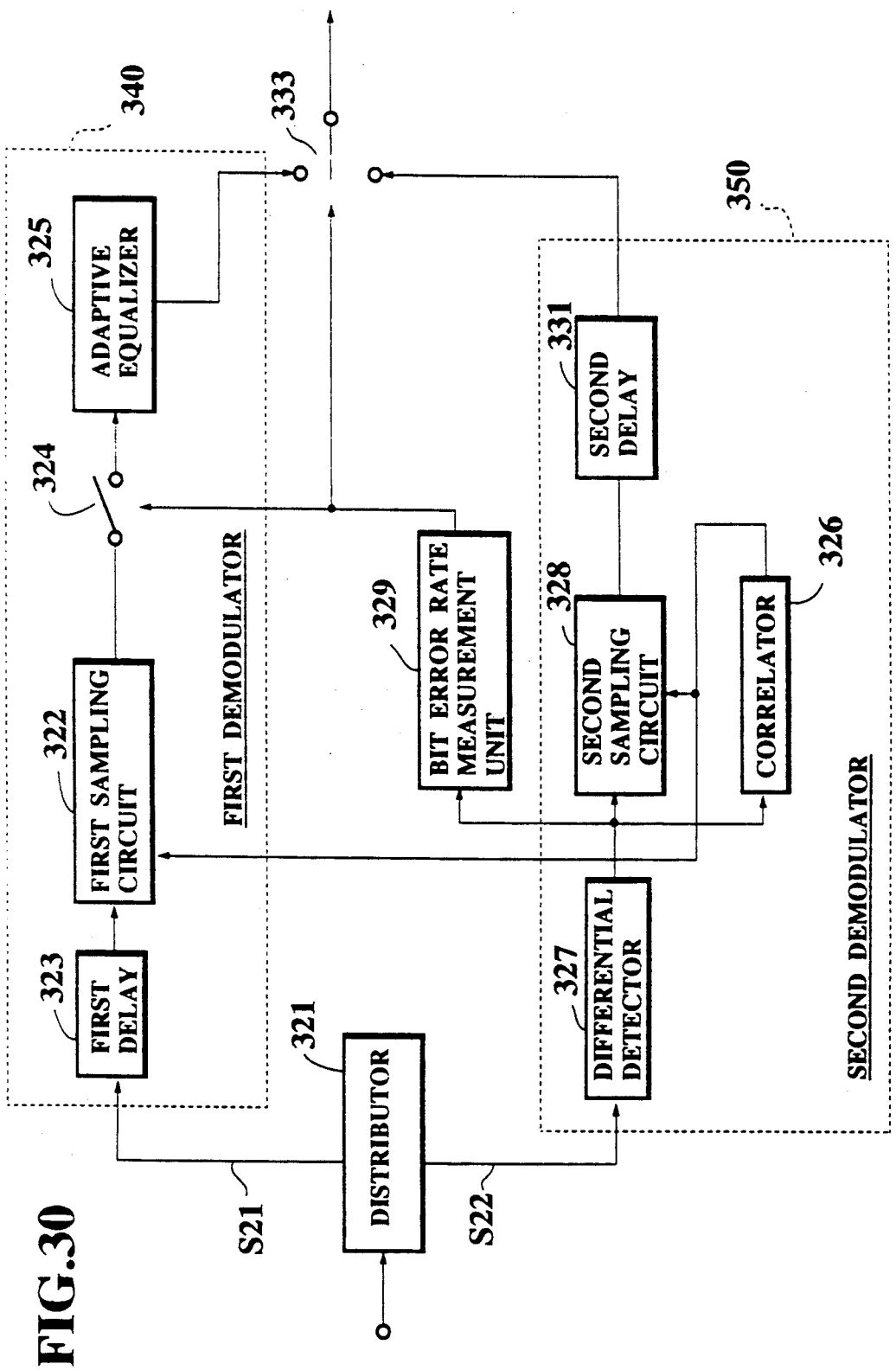
FIG. 30 is a schematic block diagram of another variation of the demodulation apparatus of FIG. 28.

It is also to be noted that the configuration of FIG. 28 may also be modified as shown in FIG. 30, such that the first delay 323 is placed in front of the first sampling circuit 322.

Figure 31:
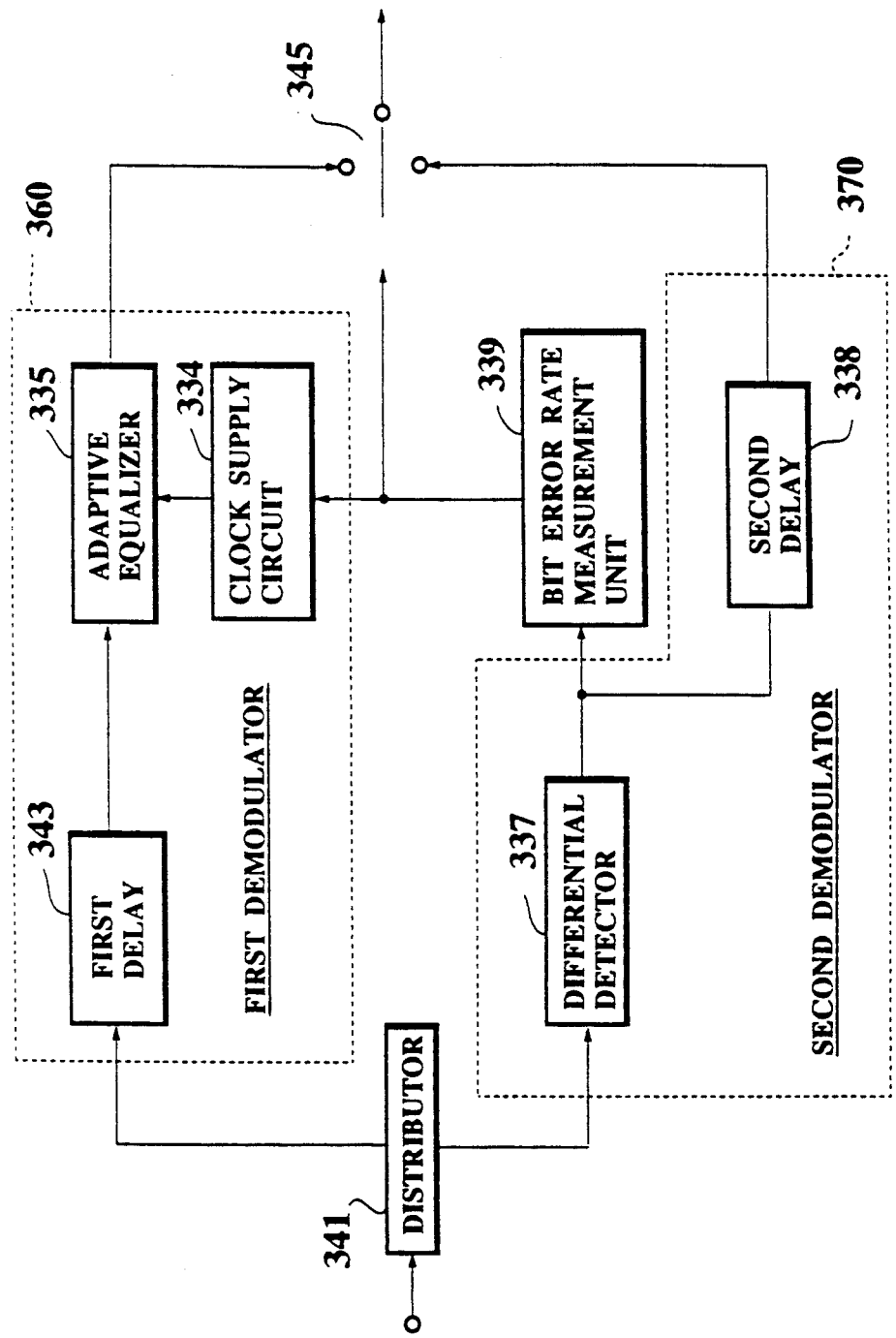
FIG. 31 is a schematic block diagram of an eleventh embodiment of a demodulation apparatus according to the present invention.

Referring now to FIG. 31, an eleventh embodiment of a demodulation apparatus according to the present invention will be described in detail.

In this embodiment, the demodulation apparatus comprises: a distributor 341 for distributing a received input signal into two passages; a first demodulator 360 incorporating an adaptive equalizer 335 which is connected with a passage coming from the distributor 341 through a first delay 343, and a clock supply circuit 334 for supplying clock signals to the adaptive equalizer 335; a second demodulator 350 without an adaptive equalizer which incorporates a differential detector 337 connected with another passage coming from the distributor 321; a second delay 338 through which the data part of the output of the differential detector 337 is outputted, and a bit error rate measurement unit 339 for measuring the bit error rate for the output of the second demodulator 370; and a switch 345 for selectively connecting one of the outputs of the first and second demodulators 360 and 370 while disconnecting the other one; and a bit error rate measurement unit 329 for measuring a bit error rate of the output of the differential detector 327, and controlling the clock supply circuit 324 and the switch 345 according to the measured bit error rate.

In this demodulation apparatus, a received input signal is distributed by the distributor 341 to the first and second demodulators 360 and 370. The first demodulator 360 incorporates the adaptive equalizer 335 capable of compensating the communication path distortion due to the presence of multipath, and obtains a digital signal by demodulating the received input signal after the communication path distortion is compensated. On the other hand, the second demodulator 370 does not incorporate an adaptive equalizer, in which the differential detector 337 obtains a digital signal by demodulating the received input signal directly.

The first delay 343 delays the transmission of the received input signal by a period longer than the training period of the received input signal, while the second delay 338 delays the transmission of the output of the differential detector 337 by a period of time taken by the adaptive equalizer 335 in equalizing the received input signal. These first and second delays 343 and 338 have the effect of synchronizing timings of the outputs of the first and second demodulators 360 and 370, as in the ninth embodiment described above.

The bit error rate measurement unit 339 then measure the bit error rate of the output signal of the differential detector 337 by comparing the training signal demodulated by the differential detector 337 with the already known training signal, and controls the switch 345 in order to select one of the outputs from the first and second demodulators 360 and 370 according to the measured bit error rate. In a case the second demodulator 370 is selected, the bit error rate measurement unit 339 also controls the clock supply circuit 334 to stop the supply of the clock signal to the adaptive equalizer 335, so as to save the power consumption by the adaptive equalizer 335 while its output is not used.

Thus, this demodulation apparatus of the eleventh embodiment also has an advantage that the power consumption of the apparatus can be reduced, just as in the ninth and tenth embodiments described above.

Figure 32:
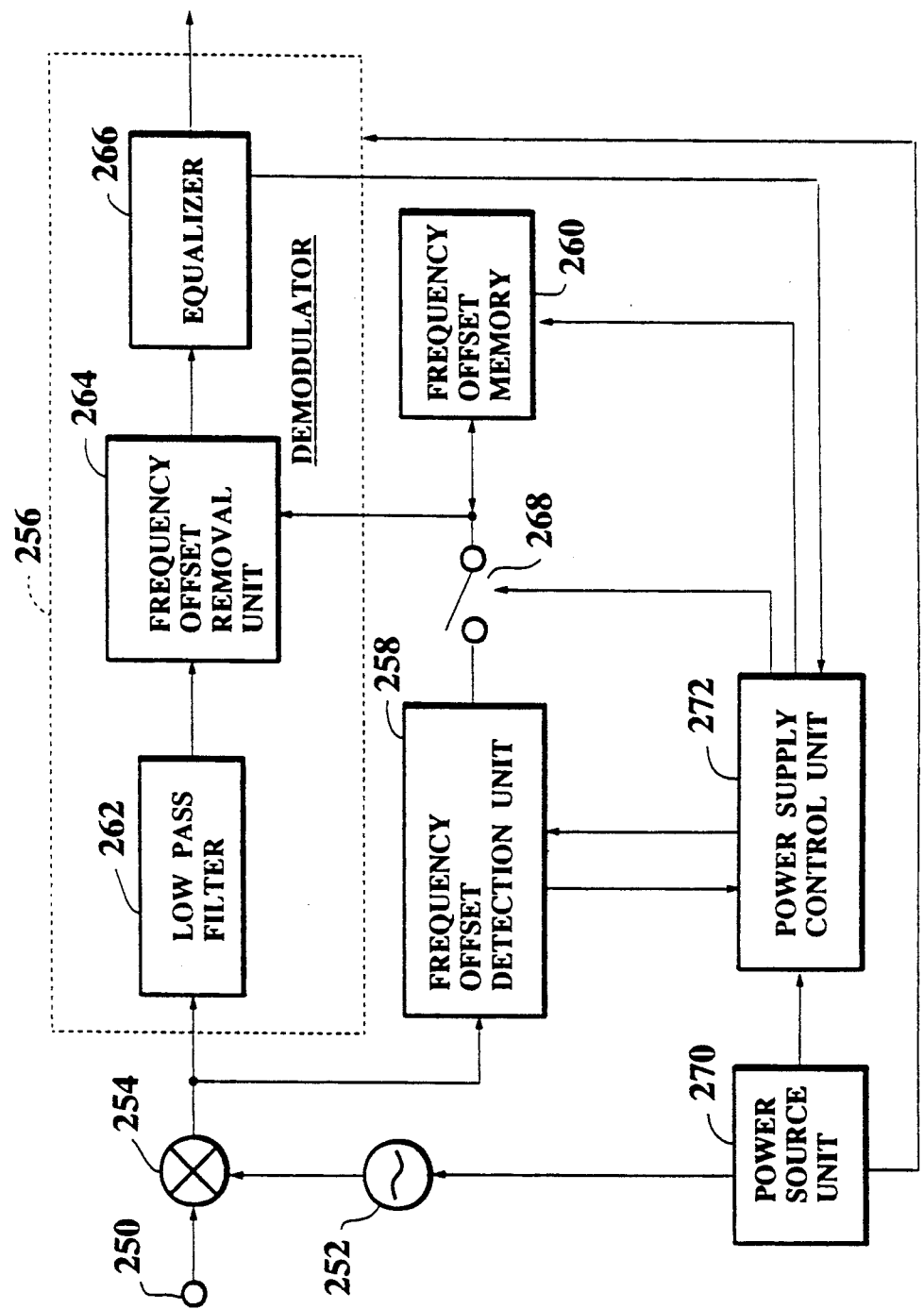
FIG. 32 is a schematic block diagram of a twelfth embodiment of a demodulation apparatus according to the present invention.

Referring now to FIG. 32, a twelfth embodiment of a demodulation apparatus according to the present invention will be described in detail.

In this embodiment, the demodulation apparatus comprises: an input terminal 250 for inputting a received input RF (or IF) signal; a local oscillator 252 for generating a local oscillator signal of a prescribed oscillator frequency; a multiplier 254 for multiplying the input RF signal with the local oscillator signal to obtain a baseband signal; a demodulator 256 for demodulating the baseband signal to obtain a digital signal; a frequency offset detection unit 258 for detecting an frequency offset from the baseband signal; a frequency offset memory 260 for storing the detected frequency offset; a switch 268 for connecting or disconnecting the frequency offset detection unit with the demodulator 256 and the frequency offset memory 260; a power source unit 270 for supplying operation power of the demodulation apparatus; and a power supply control unit 272 for controlling the supply of power from the power source unit 270 to the frequency offset detection unit 258 and the frequency offset memory 260, as well as controlling the switch 268.

The demodulator 256 further comprises a low pass filter 262 for removing low frequency components from the baseband signal; a frequency offset removal unit 264 for removing the frequency offset which is either detected by the frequency offset detection unit 258 or stored by the frequency offset memory 260, from the baseband signal; and an equalizer 266 for equalizing the baseband signal in order to obtain the digital signal while compensating the transmission path distortion. A convergence or divergence of the error signal or tap coefficients of this equalizer 266 is regularly checked and reported to the power supply control unit 272, such that the power supply control unit 272 controls the power supply and the switch 268 according to a control signal from the equalizer 266 indicating the convergence or divergence of the error signal or tap coefficients.

In this demodulation apparatus, the input RF signal received at the input terminal 250 is multiplied with the local oscillator signal by the multiplier 254, so as to obtain the baseband signal.

Then, the high frequency components are removed from the baseband signal by the low pass filter 262, while the frequency offset is detected from the baseband signal by the frequency offset detection unit 258, so that the detected frequency offset can be removed by the frequency offset removal unit 264. The baseband signals without the frequency offset thus obtained are then equalized by the equalizer 266.

Here, initially, the power supply control unit 272 controls the power supply and the switch 268 such that the power is supplied to the frequency offset detection unit 258 and the switch 268 is connected so that the frequency offset removal unit 264 can utilize the frequency offset detected by the frequency offset detection unit 258, while the supply of the power to the frequency offset memory 260 is stopped.

Then, whenever the power supply control unit 272 receives the control signal indicating the convergence of the error signal or tap coefficients of the equalizer 266, the power supply control unit 272 starts the supply of the power to the frequency offset memory 260 so that the current value of the frequency offset detected by the frequency offset detection unit 258 can be stored in the frequency offset memory 260, and then disconnects the switch 268 while stopping the supply of power to the frequency offset detection unit 258. Thus, for the subsequent input signal, the frequency offset removal unit 264 utilizes the frequency offset stored in the frequency offset memory 260.

On the other hand, whenever the power supply control unit 272 receives the control signal indicating the divergence of the error signal or tap coefficients of the equalizer 266, the power supply control unit 272 resumes the supply of the power to the frequency offset detection unit 258 and connects the switch 268, while stopping the supply of the power to the frequency offset memory 260 again, so that the frequency offset removal unit 264 can utilize the frequency offset detected by the frequency offset detection unit 258 again. Thus, for the subsequent input signal, the frequency offset removal unit 264 utilizes the frequency offset detected by the frequency offset detection unit 258.

In this manner, the power supply control unit 272 controls the switch 268 and the supply of the power to the frequency offset detection unit 258 and the frequency offset memory 260, according to the control signal from the equalizer 266.

This control by the power supply control unit 272 is effective in providing an appropriate frequency offset in the demodulation apparatus, for the following reason.

Namely, the frequency offset is mainly caused by the difference between the oscillator frequency of the local oscillator signal and the transmission frequency of the received input signal. Now, the oscillator frequency of the local oscillator signal does not change significantly in a short period of time, while the transmission frequency of the received input signal hardly changes at all because of the high precision of the transmitter at the transmission station, although there is some Doppler shift on the received input signal. Therefore, once the frequency offset is determined, there is no need to newly determine the frequency offset again for a short period of time, and consequently, the frequency offset detection unit 258 does not need to be operated during this period of time.

Now, in this demodulation apparatus of this embodiment, the frequency offset detection unit 258 is mostly not operated, so that it is possible to realize a reduced operation power for the demodulation apparatus as a whole, which is enormously advantageous for applications to the automobile telephone or the portable telephone for which the allowable size and power consumption of the apparatus are severely limited. Moreover, as the amount of calculations can be reduced, the simplified configuration and a compact size for the demodulation apparatus can also be realized.

Figure 33:
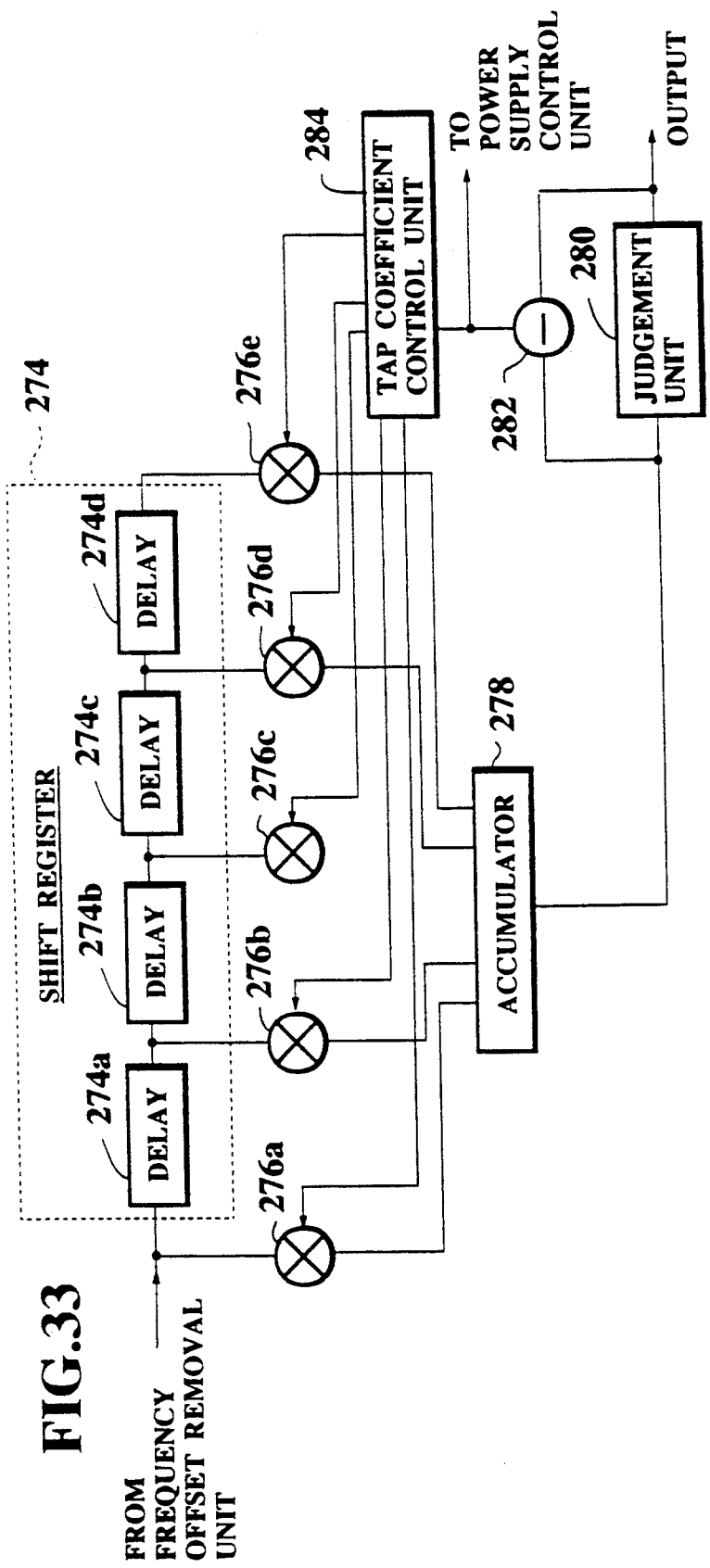
FIG. 33 is a detailed block diagram of an equalizer in the demodulation apparatus of FIG. 32.

For the equalizer 266 of this embodiment, a transversal type adaptive equalizer shown in FIG. 33 can be used.

This transversal type adaptive equalizer of FIG. 33 comprises: a shift register 274 formed by four delays 274a to 274d; five multipliers 276a to 276e for multiplying the inputs and outputs of the four delays 274a to 274d by the tap coefficients; an accumulator 278 for summing the outputs of the multipliers 276a to 276e to obtain a weighted sum; a judgement unit 280 for determining the bit codes of the input signal; a subtractor 282 for subtracting the input of the judgement unit 280 from the output of the judgement unit 280 to obtain the error signal; and a tap coefficient control unit 284 for adjusting the tap coefficients to be multiplied at the multipliers 276a to 276e according to the error signal. As an algorithm for the tap coefficient adjustment, various known algorithms such as LMS (least means square) algorithm, zero forcing algorithm, and RLS (recursive least square) algorithm can be used.

Figure 34:
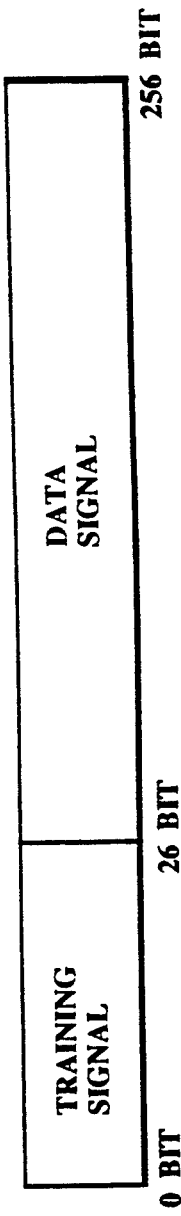
FIG. 34 is an illustration of an input data used in the demodulation apparatus of FIG. 32.

Now, the received input signal from the transmission station is bursty, and one burst of the input signal comprises a training signal which is known to the demodulation apparatus beforehand, and a data signal which contains information not known to the demodulation apparatus, as shown in FIG. 34 where the one burst of the input signal containing the 26 bit training signal and 230 bit data signal is shown.

When the training signal of such a bursty input signal is entered to the transversal type adaptive equalizer of FIG. 33, the shift register 274 shifts the training signal at each sampling. Then, the weighted sum is calculated by the multipliers 276a to 276e and the accumulator 278, while the error signal is calculated by the subtractor 282.

Here, by the tenth bit, i.e., a bit numbered by twice of a number of tap coefficients which is five in this equalizer of FIG. 33, the error signal normally approaches to a constant value. However, when the frequency offset is large, the error signals varies widely and their absolute values tend to become larger.

For this reason, the error signals for the training signal after the tenth bit are checked by obtaining an average value of their absolute values. When the obtained average value is over a prescribed threshold value, the control signal indicating the divergence of the error signal is sent to the power supply control unit 272, whereas otherwise the control signal indicating the convergence of the error signal is sent to the power supply control unit 272.

Figure 35:
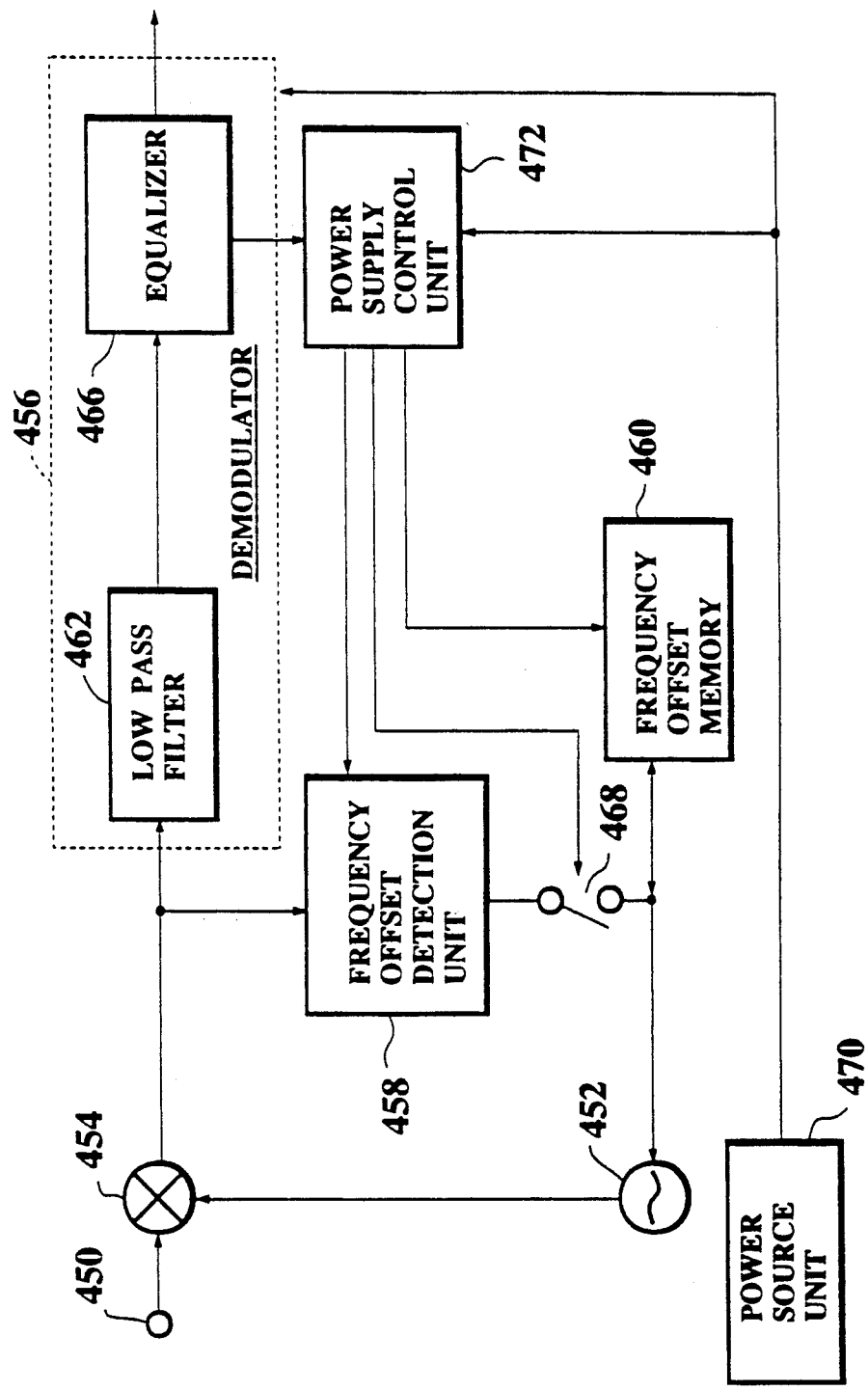
FIG. 35 is a schematic block diagram of a thirteenth embodiment of a demodulation apparatus according to the present invention.

Referring now to FIG. 35, a thirteenth embodiment of a demodulation apparatus according to the present invention will be described in detail.

In this embodiment, the demodulation apparatus comprises: an input terminal 450 for inputting a received input RF (or IF) signal; a local oscillator 452 for generating a local oscillator signal of a variable oscillator frequency; a multiplier 454 for multiplying the input RF signal with the local oscillator signal to obtain a baseband signal; a demodulator 456 for demodulating the baseband signal to obtain a digital signal; a frequency offset detection unit 458 for detecting an frequency offset from the baseband signal; a frequency offset memory 460 for storing the detected frequency offset; a switch 468 for connecting or disconnecting the frequency offset detection unit 458 with the local oscillator 452 and the frequency offset memory 260; a power source unit 470 for supplying operation power of the demodulation apparatus; and a power supply control unit 472 for controlling the supply of power from the power source unit 470 to the frequency offset detection unit 458 and the frequency offset memory 460, as well as controlling the switch 468.

The demodulator 456 further comprises a low pass filter 462 for removing low frequency components from the baseband signal; and an equalizer 466 for equalizing the baseband signal in order to obtain the digital signal while compensating the transmission path distortion. A convergence or divergence of the error signal or tap coefficients of this equalizer 466 is regularly checked and reported to the power supply control unit 472, such that the power supply control unit 472 controls the power supply and the switch 468 according to a control signal from the equalizer 466 indicating the convergence or divergence of the error signal or tap coefficients.

In this demodulation apparatus, the input RF signal received at the input terminal 450 is multiplied with the local oscillator signal by the multiplier 454, so as to obtain the baseband signal.

Then, the high frequency components are removed from the baseband signal by the low pass filter 462, while the frequency offset is detected from the baseband signal by the frequency offset detection unit 458, so that the local oscillator 452 changes the oscillator frequency so as to compensate the detected frequency offset. The baseband signals without the frequency offset thus obtained are then equalized by the equalizer 466.

Here, initially, the power supply control unit 472 controls the power supply and the switch 468 such that the power is supplied to the frequency offset detection unit 458 and the switch 468 so that the local oscillator 452 can utilize the frequency offset detected by the frequency offset detection unit 458, while the supply of the power to the frequency offset memory 460 is stopped.

Then, whenever the power supply control unit 472 receives the control signal indicating the convergence of the error signal or tap coefficients of the equalizer 466, the power supply control unit 472 starts the supply of the power to the frequency offset memory 460 so that the current value of the frequency offset detected by the frequency offset detection unit 458 can be stored in the frequency offset memory 460, and then disconnects the switch 468 while stopping the supply of power to the frequency offset detection unit 458. Thus, for the subsequent input signal, the local oscillator 452 adjusts its oscillator frequency according to the frequency offset stored in the frequency offset memory 460.

On the other hand, whenever the power supply control unit 472 receives the control signal indicating the divergence of the error signal or tap coefficients of the equalizer 466, the power supply control unit 472 resumes the supply of the power to the frequency offset detection unit 458 and connects the switch 468, while stopping the supply of the power to the frequency offset memory 460 again, so that the local oscillator 452 can utilize the frequency offset detected by the frequency offset detection unit 458 again. Thus, for the subsequent input signal, the local oscillator 452 adjusts its oscillator frequency according to the frequency offset detected by the frequency offset detection unit 458.

In this manner, the power supply control unit 472 controls the switch 468 and the supply of the power to the frequency offset detection unit 458 and the frequency offset memory 460, according to the control signal from the equalizer 466.

This control by the power supply control unit 472 is effective in providing an appropriate frequency offset in the demodulation apparatus, for the same reason as that described above for the previous embodiment.

Thus, in this demodulation apparatus of this embodiment, the frequency offset detection unit 458 is mostly not operated, so that it is possible to realize a reduced operation power for the demodulation apparatus as a whole, just as in the previous embodiment. In addition, a number of elements involved can be reduced in this embodiment, so that even more simplified configuration and compact size for the demodulation apparatus can also be realized.

For the equalizer 466 of this embodiment, a transversal type adaptive equalizer shown in FIG. 33 can be also used.

Figure 36:
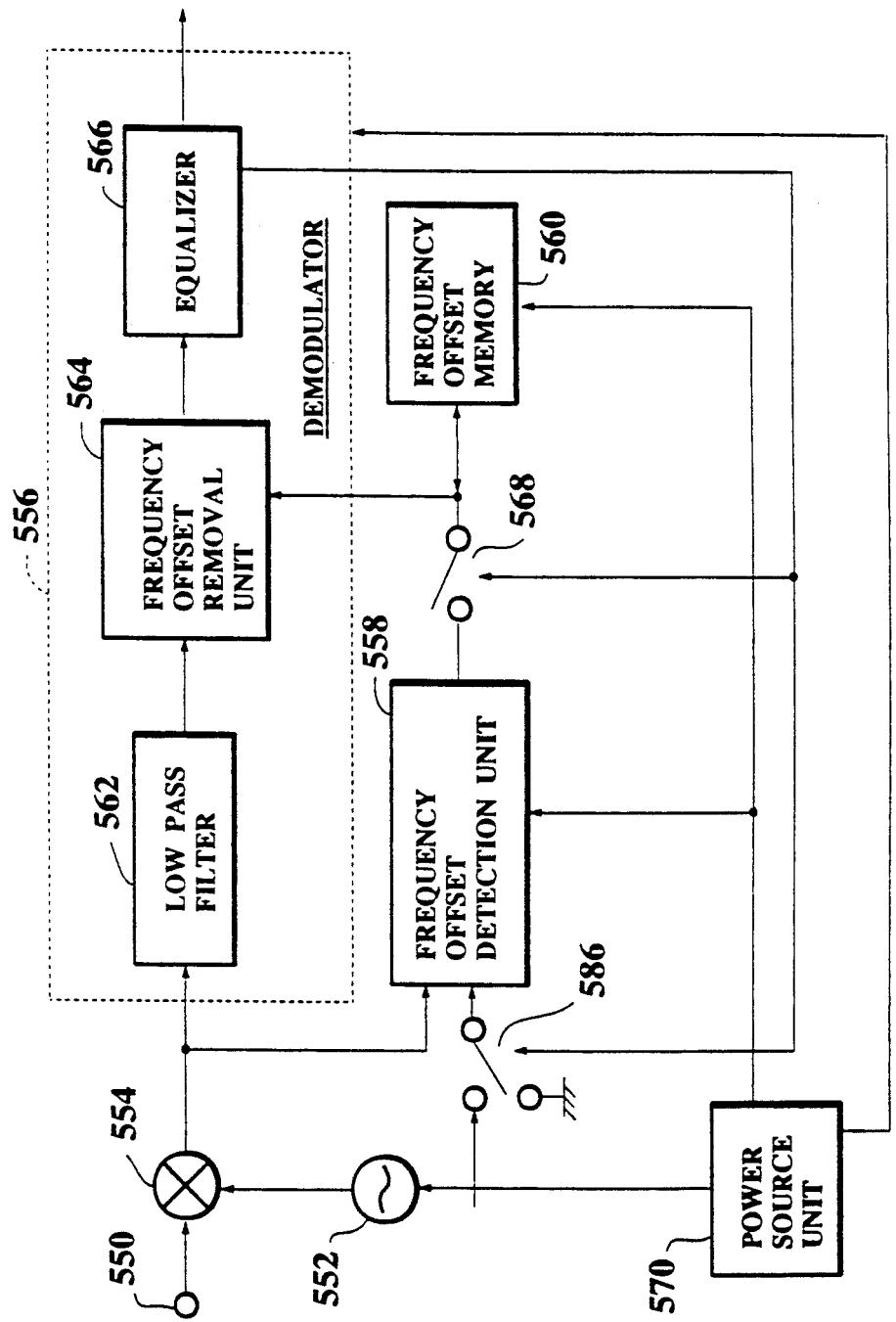
FIG. 36 is a schematic block diagram of a fourteenth embodiment of a demodulation apparatus according to the present invention.

Referring now to FIG. 36, a fourteenth embodiment of a demodulation apparatus according to the present invention will be described in detail.

In this embodiment, the demodulation apparatus comprises: an input terminal 550 for inputting a received input RF (or IF) signal; a local oscillator 552 for generating a local oscillator signal of a prescribed oscillator frequency; a multiplier 554 for multiplying the input RF signal with the local oscillator signal to obtain a baseband signal; a demodulator 556 for demodulating the baseband signal to obtain a digital signal; a frequency offset detection unit 558 for detecting an frequency offset from the baseband signal; a frequency offset memory 560 for storing the detected frequency offset; a switch 568 for connecting or disconnecting the frequency offset detection unit 558 with the frequency offset removal unit 564 and the frequency offset memory 560; a power source unit 570 for supplying operation power of the demodulation apparatus; and a clock switch 286 for controlling the supply of clock signals to the frequency offset detection unit 558.

The demodulator 556 further comprises a low pass filter 562 for removing low frequency components from the baseband signal; a frequency offset removal unit 564 for removing the frequency offset which is either detected by the frequency offset detection unit 558 or stored by the frequency offset memory 560, from the baseband signal; and an equalizer 566 for equalizing the baseband signal in order to obtain the digital signal while compensating the transmission path distortion. A convergence or divergence of the error signal or tap coefficients of this equalizer 566 is regularly checked, such that the switch 568 and the clock switch 586 are controlled according to a control signal from the equalizer 566 indicating the convergence or divergence of the error signal or tap coefficients.

In this demodulation apparatus, the input RF signal received at the input terminal 550 is multiplied with the local oscillator signal by the multiplier 554, so as to obtain the baseband signal.

Then, the high frequency components are removed from the baseband signal by the low pass filter 562, while the frequency offset is detected from the baseband signal by the frequency offset detection unit 558, so that the detected frequency offset can be removed by the frequency offset removal unit 564. The baseband signals without the frequency offset thus obtained are then equalized by the equalizer 566.

Here, initially, the switch 568 and the clock switch 586 are connected such that the clock signals are supplied to the frequency offset detection unit 558, so that the frequency offset removal unit 564 can utilize the frequency offset detected by the frequency offset detection unit 558. The detected frequency offset is also stored in the frequency offset memory 560 as it is detected.

Then, whenever the control signal indicating the convergence of the error signal or tap coefficients of the equalizer 566 is sent from the equalizer 566, the switch 568 and the clock switch 586 are disconnected, such that the clock signals are not supplied to the frequency offset detection unit 558 and therefore the frequency offset detection unit 558 stops operating, while the frequency offset removal unit 564 utilizes the frequency offset stored in the frequency offset memory 560 which stored the latest frequency offset detected by the frequency offset detection unit 558 before the supply of the clock signals stops. Thus, for the subsequent input signal, the frequency offset removal unit 564 utilizes the frequency offset stored in the frequency offset memory 560.

On the other hand, whenever the control signal indicating the divergence of the error signal or tap coefficients of the equalizer 566 is sent from the equalizer 566, the switch 568 and the clock switch 586 are connected, such that the clock signals are supplied to the frequency offset detection unit 558 again and therefore the frequency offset detection unit 558 starts operating again, so that the frequency offset removal unit 564 can utilize the frequency offset detected by the frequency offset detection unit 558 again. Thus, for the subsequent input signal, the frequency offset removal unit 564 utilizes the frequency offset detected by the frequency offset detection unit 558.

In this manner, the switch 568 and the clock switch 586 are controlled by the control signal from the equalizer 566.

This control of the switch 568 and the clock switch 586 by the control signal is effective in providing an appropriate frequency offset in the demodulation apparatus, for the same reason as that described above for the previous embodiments.

Thus, in this demodulation apparatus of this embodiment, the frequency offset detection unit 558 is mostly not operated, so that it is possible to realize a reduced operation power for the demodulation apparatus as a whole, just as in the previous embodiments. In addition, a number of elements involved can be reduced in this embodiment, so that even more simplified configuration and compact size for the demodulation apparatus can also be realized.

For the equalizer 566 of this embodiment, a transversal type adaptive equalizer shown in FIG. 33 can be also used.

Referring now to FIG. 37, a fifteenth embodiment of a demodulation apparatus according to the present invention will be described in detail.

In this embodiment, the demodulation apparatus comprises: an antenna 688 for receiving an input signal modulated to the transmission frequency; an RF converter 690 for converting the received input signal into intermediate frequency signal; a demodulator 692 including an equalizer 694 for demodulating the intermediate frequency signal in order to obtain the basic frequency level digital signal while compensating the transmission path distortion; a communication channel decoder 696 for detecting and correcting bit code errors in the demodulated signal by using a parity signal of the input signal; a power source unit 700 for supplying operation power of the demodulation apparatus; and an operation control unit 698 for controlling the operation of the demodulator 692 and the communication channel decoder 696 by controlling the power supply from the power source unit 700.

In this demodulation apparatus, the input signal received at the antenna 688 is converted into the intermediate frequency signal by the RF converter 690.

Here, the input signal contains a training signal which is known to the demodulation apparatus beforehand, a data signal which contains information not known to the demodulation apparatus, and a parity signal to be utilized in detecting and correcting the bit code errors, as shown in FIG. 38.

The converted intermediate frequency signal is then demodulated by the demodulator 692 using the equalizer 694 to obtain the basic frequency level digital signal.

In the equalizer 694, the tap coefficients are initially set to prescribed initial values, and are subsequently adjusted by using the RLS algorithm as the training signals are sampled. The error signal e(t) produced in this process of adjusting the tap coefficients, which represents a complex number in general, is sent to the operation control unit 698.

The operation control unit 698 checks the error signals e(t) for the training signal after a bit numbered by twice of a number of tap coefficients by obtaining an average value of their absolute values. When the obtained average value is over a prescribed threshold value, the reliability of the received input signal is judged insufficient so that the operation of the demodulator 692 and the communication channel decoder 696 are stopped by stopping the power supply from the power source unit 700, while receiving the data signal and the parity signal following the training signal. Otherwise, the reliability of the received input signal is judged sufficient so that the demodulator 692 and the communication channel decoder 696 are operated while receiving the data signal and the parity signal following the training signal.

In the latter case, the communication channel decoder 696 corrects correctable bit code errors in the demodulated signal by using the parity signal of the input signal and outputs the basic frequency level digital signal without the bit code errors, or detects uncorrectable bit code errors in the demodulated signal by using the parity signal of the input signal and outputs a bit code error detection signal.

Thus, in this demodulation apparatus of this embodiment, the operation of the demodulator 692 and the communication channel decoder 696 are controlled according to the judgement on the reliability of the received input signal based on the error signal of the equalizer 694, so that it is possible to realize a reduced operation power for the demodulation apparatus as a whole.

For the equalizer 694 of this embodiment, a transversal type adaptive equalizer shown in FIG. 33 can be also used.

It is to be noted that in a case the demodulator 692 and the communication channel decoder 696 are formed by using CMOS, the stopping of the operation of the demodulator 692 and the communication channel decoder 696 can be furnished by shutting off the supply of the clock signals to the demodulator 692 and the communication channel decoder 696. Otherwise, the stopping of the operation of the demodulator 692 and the communication channel decoder 696 can be furnished by physically shutting off the power supply from the power source unit 700 to the demodulator 692 and the communication channel decoder 696.

It is also to be noted that although the first to eleventh embodiments are described as incorporating a first demodulator including an equalizer and a second demodulator not including an equalizer, these embodiments can be modified to be incorporating two demodulators, each of which is including an equalizer of different equalization characteristic, where one of these two demodulators are selected in the manner one of the first and second demodulators is selected in the first to eleventh embodiments as described above.

Figure 39:
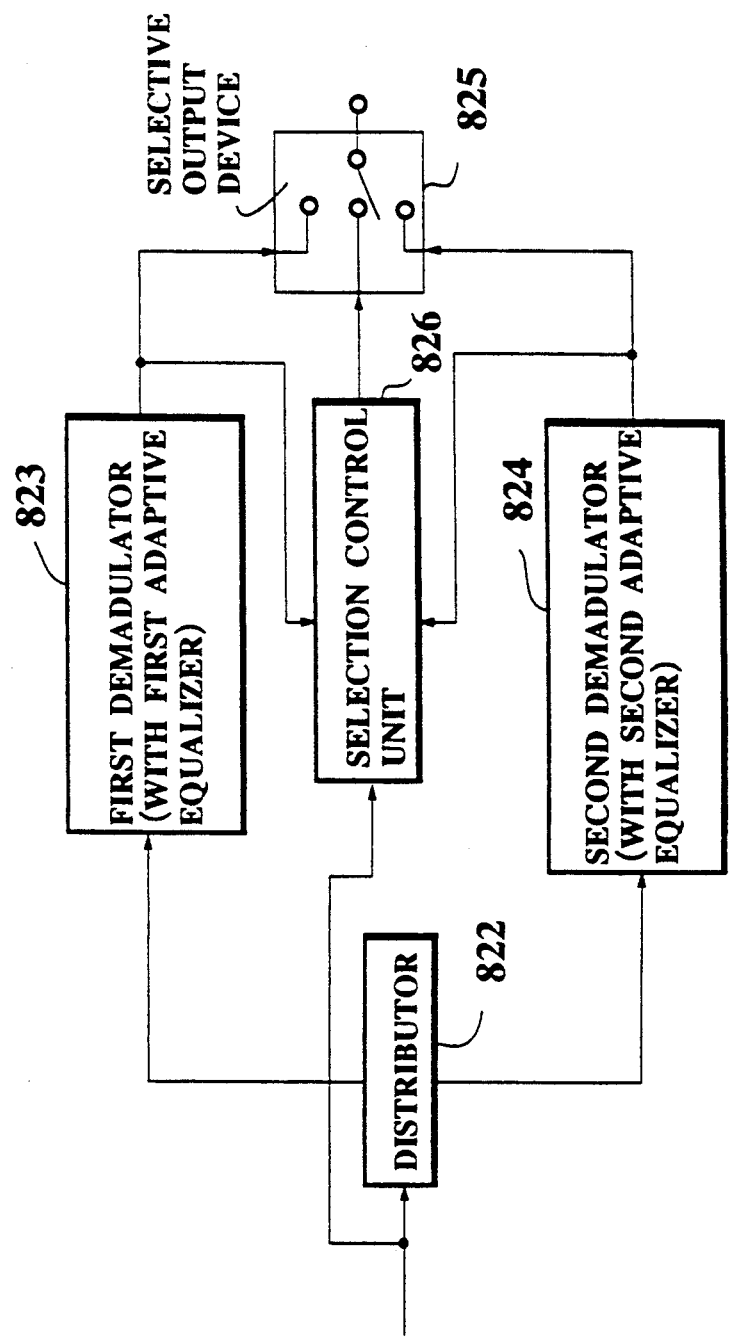
FIG. 39 is a schematic block diagram of one variation of a demodulation apparatus according to the present invention.

An example of such a variation of the demodulation apparatus is shown in FIG. 39. This demodulation apparatus comprises: a distributor 822 for distributing a bursty received input signal used into two passages; a first demodulator 823 incorporating a first adaptive equalizer which is connected with one of the two passages coming from the distributor 822; a second demodulator 824 with a second adaptive equalizer which is connected with the other one of the two passages coming from the distributor 822; a selective output unit 825 for selectively outputting one of the outputs of the first and second demodulators 823 and 824 by connecting an output of one of the first and second demodulators 823 and 824 while disconnecting the other one; and a selection control unit 826 for controlling the selective output unit 825.

When the both of the first and second demodulators 823 and 824 are equipped with equalizers as shown in FIG. 39, the bit error rate of the output of the demodulation apparatus can be made extremely low. In this case, the tracking behavior of the equalizer included in the first demodulator 823 and the tracking behavior of the equalizer included in the second demodulator 824 are preferably be different.

Moreover, one of the first and second demodulators 823 and 824 can be equipped with a pre-filter to be followed by the equalizer. This pre-filter changes the timing of the dynamic movement of channel characteristics. An adaptive matched filter can be used effectively as such a prefilter.

Furthermore, when the both of the first and second demodulators 823 and 824 are equipped with equalizers as shown in FIG. 39, the robustness to the dynamic movement of the channel characteristics is obtained, because of a slight difference in the tracking behavior or the channel movement for the first and second demodulators 823 and 824. As a consequence, even when one of the first and second equalizers fails to track the movement, the other one of the first and second equalizers can track the movement with a high probability, and a good overall bit error rate performance can be obtained.

Figure 20:
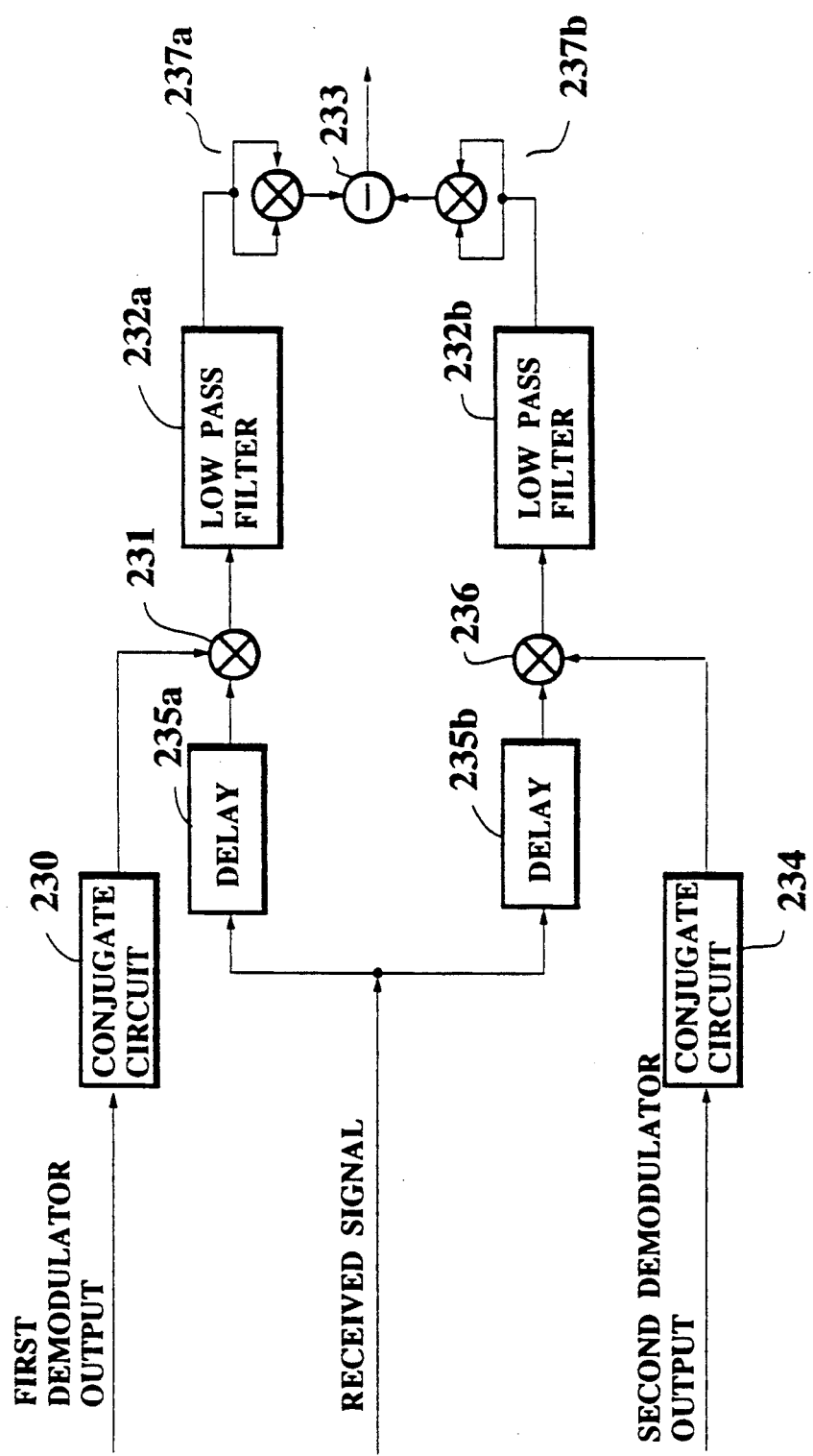
FIG. 20 is a detailed block diagram of one possible configuration of a selection control unit incorporated in the demodulation apparatus of FIG. 19.

When the selection control unit of FIG. 20 described above is used for the selection control unit 826 in the apparatus of FIG. 39, an extremely good bit error rate performance can be obtained for the following reason. Namely, when an equalizer fails to track the movement, the output of the equalizer is no longer correlated to the input signal. Now, the selection control unit of FIG. 20 is capable of monitoring the correlations of the outputs of the first and second demodulators 823 and 824 to the input signal, so that it can detect the failure of the tracking by the equalizers, and selects the appropriate one of the first and second demodulators 823 and 824 such that the use of the demodulator in the catastrophic state can effectively be avoided.

It is further to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A demodulation apparatus, comprising:
   a distributor for distributing an input signal to first and second passages;
   a first demodulator including an equalizer capable of compensating a transmission path distortion, connected with the first passage, for demodulating the input signal;
   a second demodulator, connected with the second passage, for demodulating the input signal;
   means for measuring a bit error rate of an output of the second demodulator;
   means for delaying an input of the first demodulator by a time taken by the second demodulator to demodulate the input signal and by the measuring means to measure the bit error rate;
   means for delaying an output of the second demodulator by a time taken by the first demodulator to demodulate the input signal; and
   means for selectively outputting one of the outputs of the first and second demodulators according to the measured bit error rate.

2. The apparatus of claim 1, further comprising:
   a first sampling circuit for sampling an input of the first demodulator;
   a second sampling circuit for sampling an input of the second demodulator;
   correlator means for controlling the first and second sampling circuits according to a correlation for a training signal in the input signal.

3. The apparatus of claim 1, further comprising means for stopping, for a prescribed period of time, a power supply to one of the first and second demodulators whose output is not selected by the selectively outputting means.

4. The apparatus of claim 1, further comprising means for stopping, for a prescribed period of time, a clock signal supply to one of the first and second demodulators whose output is not selected by the selectively outputting means.

5. The apparatus of claim 1, wherein the second demodulator includes a delay detector.

6. The apparatus of claim 1, wherein the second demodulator includes another equalizer which has a equalization characteristic different from that of the equalizer of the first demodulator.

* * * * *